United States Patent
Uesugi

(10) Patent No.: US 6,704,345 B1
(45) Date of Patent: Mar. 9, 2004

(54) TRANSMISSION/RECEPTION APPARATUS AND TRANSMISSION/RECEPTION METHOD

(75) Inventor: Mitsuru Uesugi, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/264,855

(22) Filed: Mar. 9, 1999

(30) Foreign Application Priority Data

Mar. 10, 1998 (JP) .......................................... 10-078318

(51) Int. Cl.[7] .......................... H04B 15/00; H04K 1/00; H04L 27/30
(52) U.S. Cl. ........................ 375/133; 375/139; 375/132
(58) Field of Search ................................ 375/132, 133, 375/134, 135, 136, 137, 139

(56) References Cited

U.S. PATENT DOCUMENTS

| | | | |
|---|---|---|---|
| 5,084,901 A | | 1/1992 | Nagazumi |
| 5,425,049 A | * | 6/1995 | Dent .......................... 375/202 |
| 5,537,434 A | * | 7/1996 | Persson et al. ............. 375/202 |
| 5,561,686 A | * | 10/1996 | Kobayashi et al. ......... 375/134 |
| 5,751,703 A | | 5/1998 | Kobayashi et al. |
| 5,812,522 A | * | 9/1998 | Lee et al. .................... 370/206 |

FOREIGN PATENT DOCUMENTS

| | | |
|---|---|---|
| EP | 667695 | 8/1995 |
| JP | 2-172338 | 7/1990 |
| JP | 4-334221 | 11/1992 |
| JP | 4-334222 | 11/1992 |
| JP | 5-336017 | 12/1993 |
| JP | 7-038522 | 2/1995 |
| JP | 7-162393 | 6/1995 |
| JP | 7-226696 | 8/1995 |
| JP | 8-237219 | 9/1996 |
| JP | 8-316879 | 11/1996 |
| JP | 9-102980 | 4/1997 |

OTHER PUBLICATIONS

English Language Abstract of JP 7–226696.
English Language Abstract of J P8–316879.
English Language Abstract of JP7–162393.
English Language Abstract of JP 9–102980.
English Language Abstract of JP 4–334221.
English Language Abstract of JP 4–334222.

* cited by examiner

*Primary Examiner*—Phoung Phu
(74) *Attorney, Agent, or Firm*—Greenblum & Bernstein, P.L.C.

(57) ABSTRACT

The transmission/reception apparatus of the present invention, on its transmitting side, performs sweeping by sweep circuit 106 that changes with time the central frequency of a modulated signal according to a predetermined sweep pattern of frequency change controller 107 and then transmits the signal. On its receiving side, it detects a received signal while sweeping the central frequency with the same sweep pattern as that on the transmitting side created by frequency change controller 112. In this way, signals are transmitted correctly.

21 Claims, 13 Drawing Sheets

TRANSMISSION/RECEPTION APPARATUS AND TRANSMISSION/RECEPTION METHOD

BACKGROUND OF THE INVENTION

1. Field of the Invention

The present invention relates to transmission/reception apparatuses and methods, capable of improving advantages of the CDMA (Code Division Multiple Access) system, etc. in a mobile communication system which is effective in satisfying conditions such as overcoming multi-path fading, improving transmission quality, improving frequency utilization efficiency and storing multi-rate information.

2. Description of the Related Art

Conventionally, access systems such as FDMA (Frequency Division Multiple Access), TDMA (Time Division Multiple Access) and CDMA are actually used in mobile communications. It is essential for these access systems to overcome multi-path fading, improve the transmission quality, improve the frequency utilization efficiency and store multi-rate information, etc., as described above, and the CDMA system is currently considered to be an effective system meeting these requirements.

The CDMA system is a system in which the transmitting side sends transmission information in frame units after multiplying it by a spreading code and the receiving side extracts the original transmission information by multiplying the received signal by the same spreading code.

FIG. 1 is a block diagram of conventional transmission/reception apparatuses. Here, the transmission/reception apparatuses are a base station and mobile stations (communication terminal apparatuses) of a mobile communication system, which is based on the CDMA system.

In FIG. 1, base station 1300 carries out radio communications with a first to third mobile stations 1301 to 1303. In this example, base station 1300 is provided with a communication circuit with three mobile stations and comprises their respective voice encoders 1310 to 1312, error correction encoders 1313 to 1315, modulators 1316 to 1318, spreaders 1319 to 1321, adder 1322, amplifier 1323, antenna 1324, matched filters 1325 to 1327, RAKE combiners 1328 to 1330, error correction decoders 1331 to 1333, and voice decoders 1334 to 1336.

First mobile station 1301 comprises antenna 1340, matched filter 1341, RAKE combiner 1342, error correction decoder 1343, voice decoder 1344, voice encoder 1345, error correction encoder 1346, modulator 1347, spreader 1348, and amplifier 1349.

Second mobile station 1302 comprises antenna 1350, matched filter 1351, RAKE combiner 1352, error correction decoder 1353, voice decoder 1354, voice encoder 1355, error correction encoder 1356, modulator 1357, spreader 1358, and amplifier 1359.

Third mobile station 1303 comprises antenna 1360, matched filter 1361, RAKE combiner 1362, error correction decoder 1363, voice decoder 1364, voice encoder 1365, error correction encoder 1366, modulator 1367, spreader 1368, and amplifier 1369.

In the mobile communication system configured as shown above, the following is an explanation of a case where transmission is carried out from base station 1300 to mobile stations 1301 to 1303.

First, for first mobile station 1301, base station 1300 carries out error correction encoding using error correction encoder 1313 on digital data created by voice encoder 1310, modulates the encoded data with error correction using modulator 1316 and multiplies it by a user-specific spreading code using spreader 1319.

Likewise, for second mobile station 1302, base station 1300 processes transmission data using voice encoder 1311, error correction encoder 1314, modulator 1317 and spreader 1320, and for third mobile station 1303, it processes transmission data using voice encoder 1312, error correction encoder 1315, modulator 1318 and spreader 1321.

Each spread signal is summed up in adder 1322, amplified in amplifier 1323 and emitted from antenna 1324.

In first mobile station 1301, a signal is received by antenna 1340 and only a desired signal is extracted by matched filter 1341, subjected to path diversity by RAKE combiner 1342, subjected to error correction decoding to improve the reception quality by error correction decoder 1343, and voice is reproduced by voice decoder 1344.

In second mobile station 1302, only the voice of a desired user is reproduced likewise using antenna 1350, matched filter 1351, RAKE combiner 1352, error correction decoder 1353 and voice decoder 1354. In third mobile station 1303, only the voice of a desired user is reproduced likewise using antenna 1360, matched filter 1361, RAKE combiner 1362, error correction decoder 1363 and voice decoder 1364.

Then, transmission from mobile stations 1301 to 1303 to base station 1300 is explained.

In first mobile station 1301, digital data created by voice encoder 1345 are subjected to error correction encoding by error correction encoder 1346, the encoded data with error correction are modulated by modulator 1347, given user-specific spreading in spreader 1348, amplified by amplifier 1349 and emitted from antenna 1340.

In second mobile station 1302, a signal is emitted likewise through voice encoder 1355, error correction encoder 1356, modulator 1357, spreader 1358, amplifier 1359 and antenna 1350. In third mobile station 1303, a signal is emitted likewise through voice encoder 1365, error correction encoder 1366, modulator 1367, spreader 1368, amplifier 1369 and antenna 1360. All these signals are emitted on a same frequency.

Base station 1300 receives signals transmitted from mobile stations through antenna 1324, extracts only the signal of first mobile station 1301 by matched filter 1325, carries out path diversity by RAKE combiner 1328 and error correction decoding to improve the reception quality by error correction decoder 1331, and reproduces voice by voice decoder 1334.

Likewise, base station 1300 extracts only the signal of second mobile station 1302 by matched filter 1326, carries out path diversity by RAKE combiner 1329 and error correction decoding to improve the reception quality by error correction decoder 1332, and reproduces voice by voice decoder 1335. Furthermore, base station 1300 extracts only the signal of third mobile station 1303 by matched filter 1327, carries out path diversity by RAKE combiner 1330 and error correction decoding to improve the reception quality by error correction decoder 1333, and reproduces voice by voice decoder 1336.

Thus, through CDMA transmissions, signals of mobile stations 1301 to 1303 are spread by different codes and superimposed on a same frequency. In this case, spreading allows a short de-lay time path to be separated, making it possible not only to eliminate influences of multi-path fading through RAKE reception but also to produce path diversity effects, improving the line quality.

Furthermore, the CDMA system can implement a uniform transmission quality for all mobile stations 1301 to 1303 and also allows adjacent cells to use a same frequency, possessing features such as high frequency utilization efficiency and easy multi-rate accommodation.

However, in the conventional transmission/reception apparatus above, carrying out RAKE reception requires accurate detection of fingers, that is, accurate detection of the fading status, delay wave status, etc., which takes considerable time.

Moreover, if at least one of a plurality of mobile stations fails in power control or has noise with great power over a narrow band, its interference may disable communications of all mobile stations within a cell or within peripheral cells.

The number of paths is also variable with time, which may prevent path diversity effects from being always obtained.

Bands available to the system are also restricted due to the chip rate which is the multiplication factor after spreading, limiting its implementation only to bands which are an integer times the bandwidth.

Furthermore, since many mobile stations use a same frequency band simultaneously, the scale of an interference cancellation apparatus introduced to increase their capacities is also increased.

Moreover, synchronization at a fast chip rate is required, but it is difficult to implement the function to establish such synchronization.

SUMMARY OF THE INVENTION

It is an objective of the present invention to provide a transmission/reception apparatus and method capable of eliminating waste time for accurate finger detection during RAKE reception, communication disabled state of all mobile stations within a cell due to radio interference among mobile stations, reduction of path diversity effect due to the number of paths variable with time, restrictions on introduction of the frequency band to the system due to restrictions on the band available to the system, expansion of an interference cancellation apparatus introduced to increase capacities, difficulties in establishing synchronization at a fast chip rate, etc.

DETAILED DESCRIPTION OF THE PREFERRED EMBODIMENTS

With reference now to the attached drawings, the embodiments of the present invention are explained in detail below.

(Embodiment 1)

Figure 1:
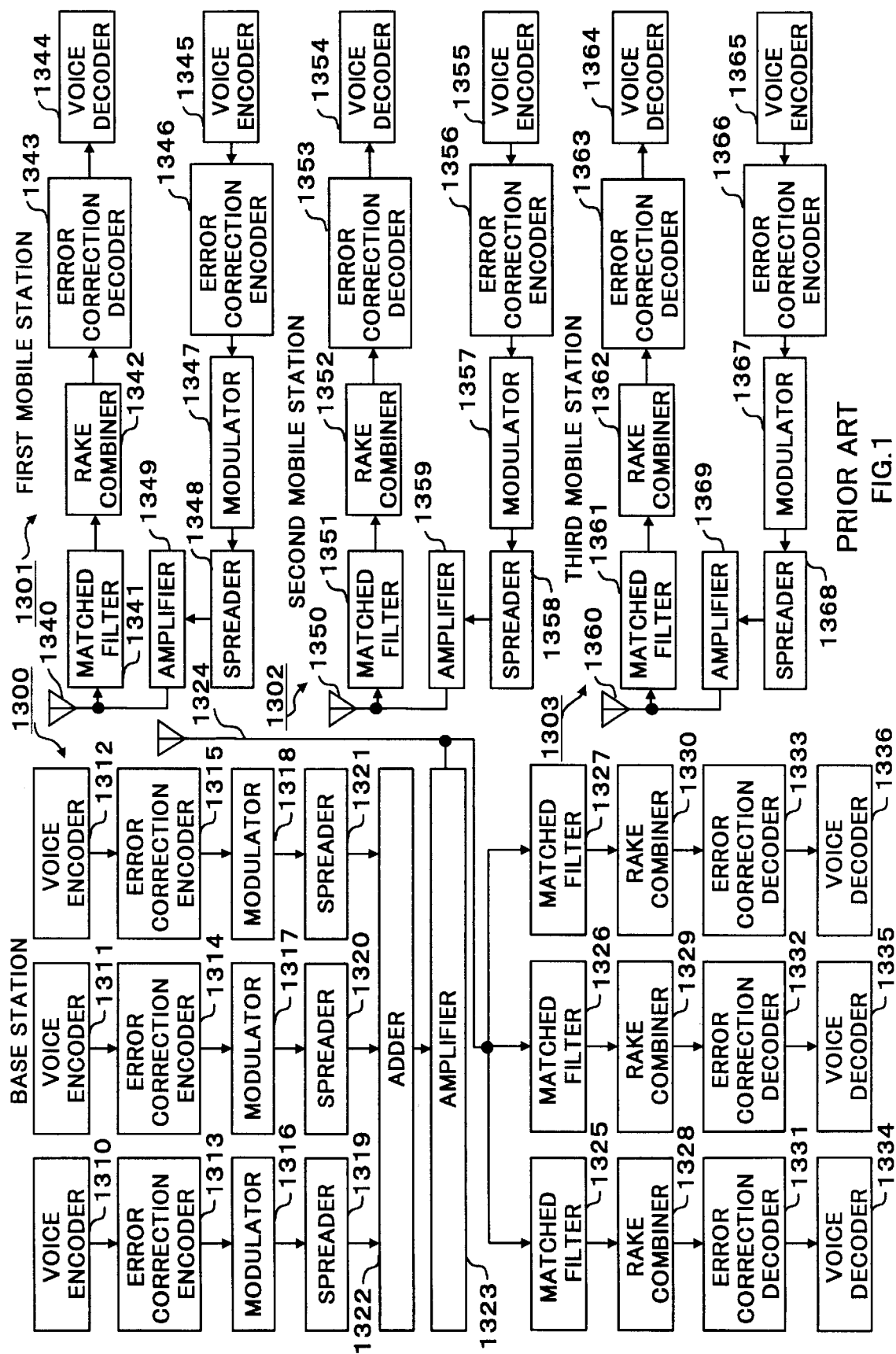
FIG. 1 is a block diagram showing the configuration of a conventional transmission/reception apparatus.
Figure 2:
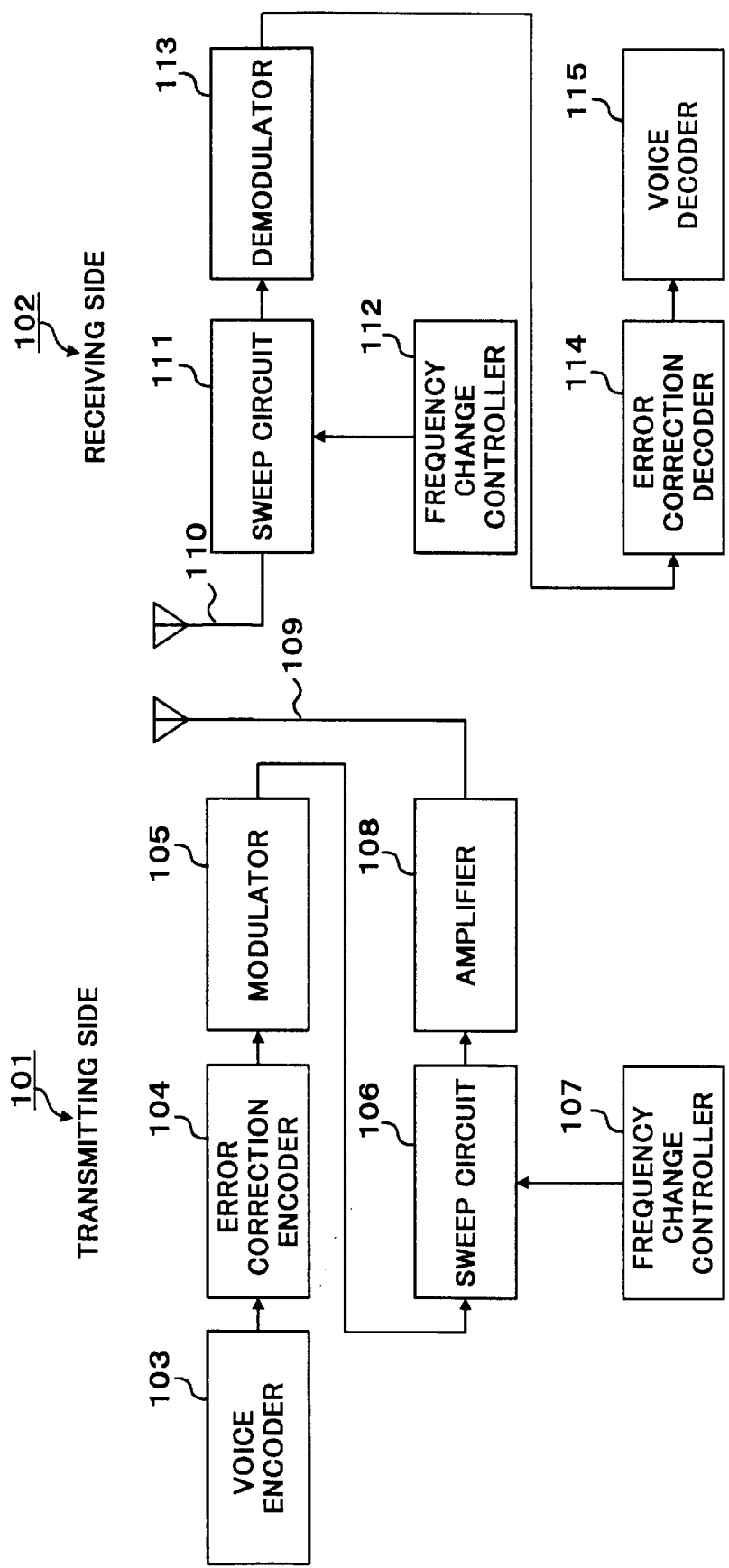
FIG. 2 is a block diagram showing the configuration of a transmission/reception apparatus according to Embodiment 1 of the present invention.

FIG. 2 is a block diagram showing the configuration of a transmission/reception apparatus according to Embodiment 1 of the present invention. In the present embodiment, suppose that the transmission apparatus is a base station and the reception apparatus is a mobile station (communication terminal apparatus) in a mobile communication system.

A feature of Embodiment 1 is the use of an SWMDA (Sweep Division Multiple Access) system in which the central frequency of a modulated signal is swept according to the present invention for a transmission/reception apparatus.

In FIG. 2, 101 represents a base station and 102 represents a mobile station. Base station 101 comprises voice encoder 103, error correction encoder 104, modulator 105, sweep circuit 106, frequency change controller 107, amplifier 108 and antenna 109.

Mobile station 102 comprises antenna 110, sweep circuit 111, frequency change controller 112, demodulator 113, error correction decoder 114 and voice decoder 115.

In the transmission/reception apparatus configured as shown above, base station 101 performs error correction encoding on the digital data created by voice encoder 103 using error correction encoder 104, modulates it by modulator 105 and sweeps its central frequency by sweep circuit 106. The sweep pattern at this time is generated by frequency change controller 107. The swept signal is amplified by amplifier 108 and emitted from antenna 109.

Mobile station 102 receives a signal from base station 101 through antenna 110 and detects it while sweeping its central frequency using sweep circuit 111. Suppose that the sweep pattern at this time is generated by frequency change controller 112 and the pattern is the same as that generated by frequency change controller 107 of base station 101. The detected signal is demodulated by demodulator 113, error-corrected by error correction decoder 114 and reproduced as voice by voice decoder 115.

As shown above, Embodiment 1 can correctly transmit signals by applying the sweep division multiple access system to the transmission/reception apparatus and performing sweeping with a same pattern. By the way, the present embodiment can also be implemented easily with complicated sweep patterns by using digital signal processing after performing a wideband sampling in actual practice.

(Embodiment 2)

Figure 3:
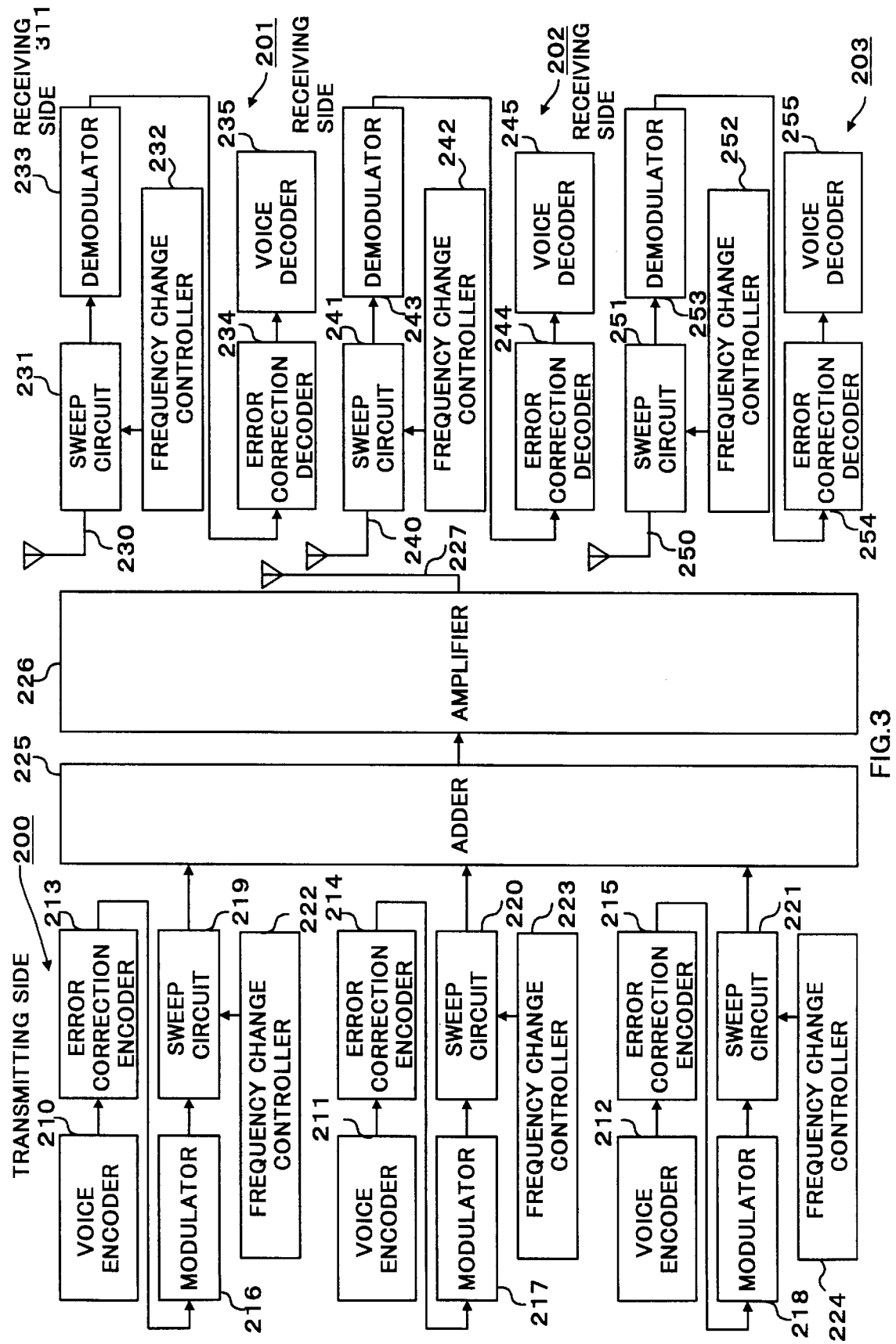
FIG. 3 is a block diagram showing the configuration of a transmission/reception apparatus according to Embodiment 2 of the present invention.

FIG. 3 is a block diagram showing the configuration of a transmission/reception apparatus according to Embodiment 2 of the present invention. In the present embodiment, suppose that the transmission apparatus is a base station and the reception apparatuses are mobile stations in a mobile communication system.

A feature of Embodiment 2 is that the transmission apparatus simultaneously transmits signals of a plurality of users by sweeping them with mutually different sweep patterns.

In FIG. 3, 200 represents a base station and 201 to 203 represent a first to third mobile stations. In this example, base station 200 is provided with communication circuits for three mobile stations, comprising voice encoders 210 to 212, error correction encoders 213 to 215, modulators 216 to 218, sweep circuits 219 to 221, frequency change controllers 222 to 224, adder 225, amplifier 226 and antenna 227.

First mobile station 201 comprises antenna 230, sweep circuit 231, frequency change controller 232, demodulator 233, error correction decoder 234 and voice decoder 235.

Second mobile station 202 comprises antenna 240, sweep circuit 241, frequency change controller 242, demodulator 243, error correction decoder 244 and voice decoder 245.

Third mobile station 203 comprises antenna 250, sweep circuit 251, frequency change controller 252, demodulator 253, error correction decoder 254 and voice decoder 255.

The operation of the transmission/reception apparatus configured as shown above is explained. This example illustrates a case with three users where a signal is transmitted from base station 200 to mobile stations 201 to 203 of the respective users, but transmission of a signal from mobile stations 201 to 203 to base station 200 is also the same operation.

First, in base station 200, for first mobile station 201, a digital signal created by voice encoder 210 is encoded with error correction by error correction encoder 213, modulated by modulator 216, and the central frequency of the signal is changed by sweep circuit 219 according to a first sweep pattern created by frequency change controller 222.

For second mobile station 202, a digital signal created by voice encoder 211 is encoded with error correction by error correction encoder 214, modulated by modulator 217, and the central frequency of the signal is changed by sweep circuit 220 according to a second sweep pattern different from the first sweep pattern created by frequency change controller 223.

For third mobile station 203, a digital signal created by voice encoder 212 is encoded with error correction by error correction encoder 215, modulated by modulator 218, and the central frequency of the signal is changed by sweep circuit 221 according to a third sweep pattern different from the first and second sweep patterns created by frequency change controller 224.

The signals changed by their respective sweep patterns are summed up by adder 225, amplified by amplifier 226 and then emitted from antenna 227. Here, the signal emitted from antenna 227 is a mixture of signals directed to a plurality of mobile stations 201 to 203, but they have been changed with mutually different sweep patterns, and thus mobile stations 201 to 203 each can receive only the corresponding signal by receiving it with the same sweep pattern as that of the base station.

That is, first mobile station 201, after receiving a signal by antenna 230, extracts a desired signal by sweeping it using sweep circuit 231 according to the same first sweep pattern as that on the transmitting side created by frequency change controller 232. Then, the signal is demodulated by demodulator 233, subjected to error correction by error correction decoder 234 and its voice is reproduced by voice decoder 235.

Furthermore, second mobile station 202, after receiving a signal by antenna 240, extracts a desired signal by sweeping it using sweep circuit 241 according to the same second sweep pattern as that on the transmitting side created by frequency change controller 242. Then, the signal is demodulated by demodulator 243, subjected to error correction by error correction decoder 244 and its voice is reproduced by voice decoder 245.

Furthermore, third mobile station 203, after receiving a signal by antenna 250, extracts a desired signal by sweeping it using sweep circuit 251 according to the same third sweep pattern as that on the transmitting side created by frequency change controller 252. Then, the signal is demodulated by demodulator 253, subjected to error correction by error correction decoder 254 and its voice is reproduced by voice decoder 255.

As shown above, according to Embodiment 2, mobile stations 201 to 203 can demodulate a desired signal by base station 200 providing different frequency changes according to mobile stations 201 to 203. In this case, even if signals to a plurality of mobile stations 201 to 203 overlap, each central frequency is shifted causing the amount of interference to be variable with time, and thus the signal quality can be maintained by combining with error correction and interleaving, etc. This makes it possible to achieve multiple access with a same frequency resource used by a plurality of users.

(Embodiment 3)

Figure 4:
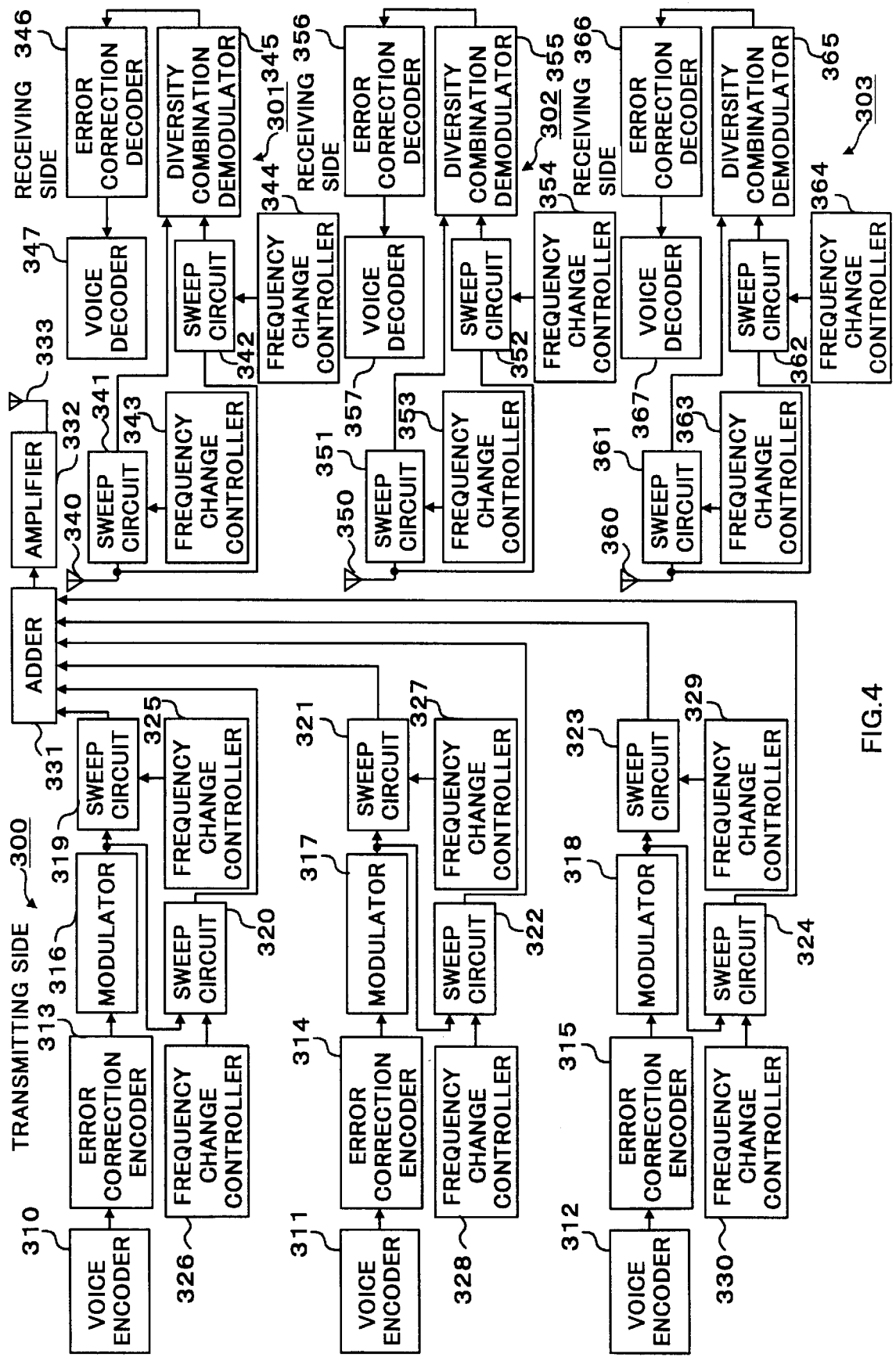
FIG. 4 is a block diagram showing the configuration of a transmission/reception apparatus according to Embodiment 3 of the present invention.

FIG. 4 is a block diagram showing the configuration of a transmission/reception apparatus according to Embodiment 3 of the present invention. In the present embodiment, suppose that the transmission apparatus is a base station and the reception apparatuses are mobile stations in a mobile communication system.

A feature of Embodiment 3 is that each user can perform frequency diversity by using a plurality of carriers.

In FIG. 4, 300 represents a base station and 301 to 303 represent a first to third mobile stations. In this example, base station 300 is provided with communication circuits for three mobile stations, comprising voice encoders 310 to 312, error correction encoders 313 to 315, modulators 316 to 318, sweep circuits 319 to 324, frequency change controllers 325 to 330, adder 331, amplifier 332 and antenna 333.

First mobile station 301 comprises antenna 340, sweep circuits 341 and 342, frequency change controllers 343 and 344, diversity combination demodulator 345, error correction decoder 346 and voice decoder 347.

Second mobile station 302 comprises antenna 350, sweep circuits 351 and 352, frequency change controllers 353 and 354, diversity combination demodulator 355, error correction decoder 356 and voice decoder 357.

Third mobile station 303 comprises antenna 360, sweep circuits 361 and 362, frequency change controllers 363 and 364, diversity combination demodulator 365, error correction decoder 366 and voice decoder 367.

The operation of the transmission/reception apparatus configured as shown above is explained. This example illustrates a case-where a signal is transmitted from base station 300 to mobile stations 301 to 303, but transmission of a signal from mobile stations 301 to 303 to base station 300 is also the same operation.

First, in base station 300, for first mobile station 301, a digital signal created by voice encoder 310 is encoded with error correction by error correction encoder 313, modulated by modulator 316 and then branched off in two directions.

In one branch, the central frequency of the signal is changed by sweep circuit 319 according to a first sweep pattern created by frequency change controller 325. In the other branch, the central frequency of the signal is changed by sweep circuit 320 according to a second sweep pattern which is different from the other created by frequency change controller 326. This allows the signal to be carried on two subcarriers with central frequencies of different patterns.

For second mobile station 302, a digital signal created by voice encoder 311 is encoded with error correction by error correction encoder 314, modulated by modulator 317 and then branched off in two directions.

In one branch, the central frequency of the signal is changed by sweep circuit 321 according to a third sweep pattern which is different from the others created by frequency change controller 327. In the other branch, the central frequency of the signal is changed by sweep circuit 322 according to a fourth sweep pattern which is different from the others created by frequency change controller 328.

For third mobile station 303, a digital signal created by voice encoder 312 is encoded with error correction by error correction encoder 315, modulated by modulator 318 and then branched off in two directions.

In one branch, the central frequency of the signal is changed by sweep circuit 323 according to a fifth sweep pattern which is different from the others created by frequency change controller 329. In the other branch, the central frequency of the signal is changed by sweep circuit 324 according to a sixth sweep pattern which is different from the others created by frequency change controller 330.

The signals changed with their respective sweep patterns are summed up by adder 331, amplified by amplifier 332 and emitted from antenna 333. Here, the signal emitted from antenna 333 is a mixture of signals directed to a plurality of mobile stations 301 to 303, but they have been changed with mutually different sweep patterns, and thus mobile stations 301 to 303 each can receive only the corresponding signal by receiving it with the same sweep pattern as that of the base station.

First mobile station 301, after receiving a signal by antenna 340, extracts a first desired signal by sweeping it using sweep circuit 341 according to the same first sweep pattern as that on the transmitting side created by frequency change controller 343, extracts a second desired signal by sweeping it using sweep circuit 342 according to the same second sweep pattern as that on the transmitting side created by frequency change controller 344. Then, the signals are demodulated by diversity combination demodulator 345, subjected to error correction by error correction decoder 346 and their voice is reproduced by voice decoder 347.

Second mobile station 302, after receiving a signal by antenna 350, extracts a first desired signal by sweeping it using sweep circuit 351 according to the same third sweep pattern as that on the transmitting side created by frequency change controller 353, extracts a second desired signal by sweeping it using sweep circuit 354 according to the same fourth sweep pattern as that on the transmitting side created by frequency change controller 354. Then, the signals are demodulated by diversity combination demodulator 355, subjected to error correction by error correction decoder 356 and their voice is reproduced by voice decoder 357.

Third mobile station 303, after receiving a signal by antenna 360, extracts a first desired signal by sweeping it using sweep circuit 361 according to the same fifth sweep pattern as that on the transmitting side created by frequency change controller 363, extracts a second desired signal by sweeping it using sweep circuit 362 according to the same sixth sweep pattern as that on the transmitting side created by frequency change controller 364. Then, the signals are demodulated by diversity combination demodulator 365, subjected to error correction by error correction decoder 366 and their voice is reproduced by voice decoder 367.

As shown above, according to Embodiment 3, mobile stations 301 to 303 can demodulate a desired signal by base station 300 providing different frequency changes according to the mobile stations and their subcarriers.

Even if signals to a plurality of mobile stations 301 to 303 overlap, each central frequency is shifted causing the amount of interference to be variable with time, and thus the signal quality can be maintained by combining with error correction and interleaving, etc. This makes it possible to achieve multiple access with a same frequency resource used by a plurality of users.

(Embodiment 4)

Figure 5:
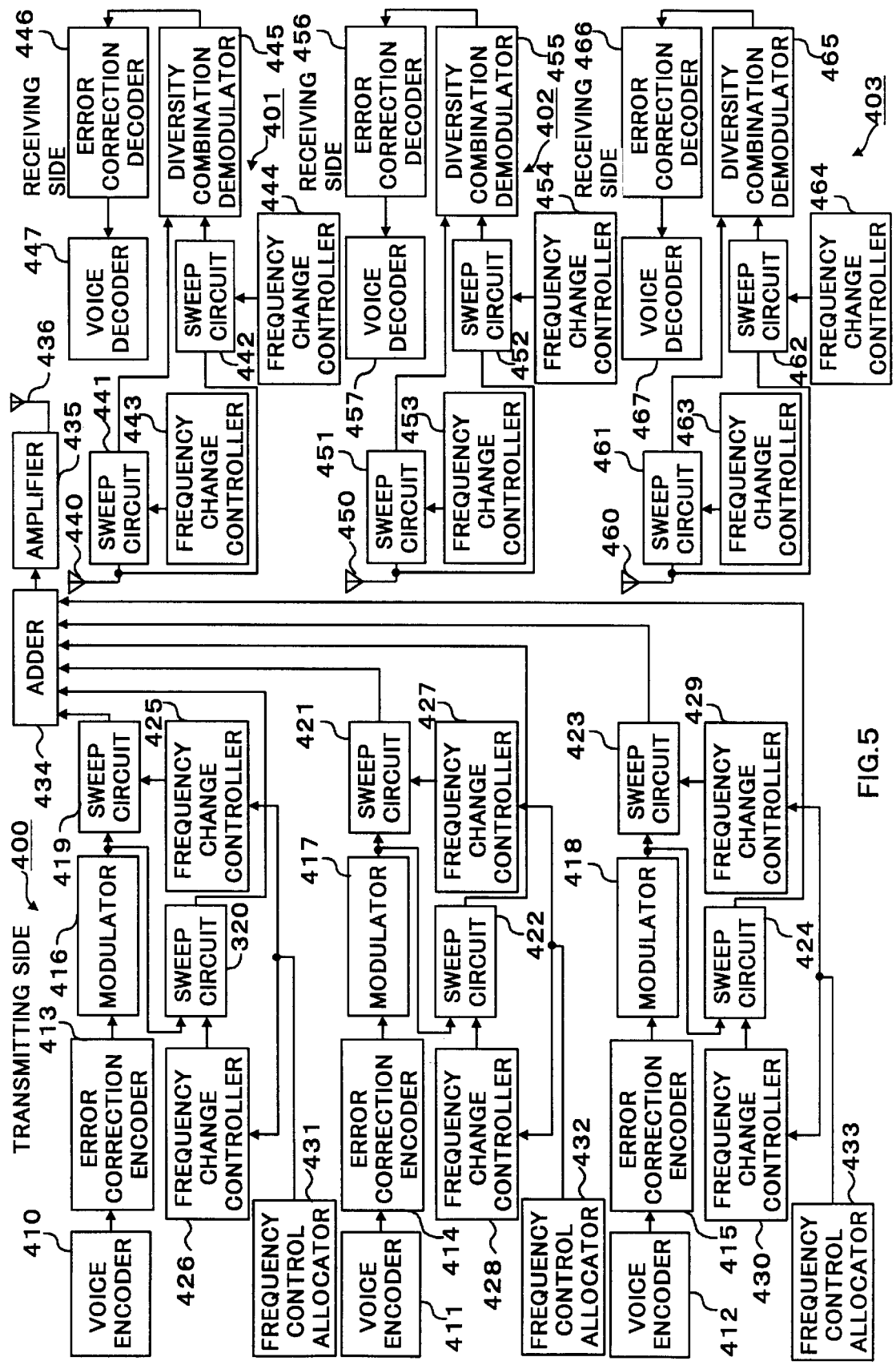
FIG. 5 is a block diagram showing the configuration of a transmission/reception apparatus according to Embodiment 4 of the present invention.

FIG. 5 is a block diagram showing the configuration of a transmission/reception apparatus according to Embodiment 4 of the present invention. Here, suppose that the transmission apparatus is a base station and the reception apparatuses are mobile stations in a mobile communication system.

A feature of Embodiment 4 is that signals of a same user in Embodiment 3 are designed not to overlap.

In FIG. 5, 400 represents a base station and 401 to 403 represent a first to third mobile stations. In this example, base station 400 is provided with communication circuits for three mobile stations, comprising voice encoders 410 to 412, error correction encoders 413 to 415, modulators 416 to 418, sweep circuits 419 to 424, frequency change controllers 425 to 430, frequency control allocators 431 to 433, adder 434, amplifier 435 and antenna 436.

First mobile station 401 comprises antenna 440, sweep circuits 441 and 442, frequency change controllers 443 and 444, diversity combination demodulator 445i error correction decoder 446 and voice decoder 447.

Second mobile station 402 comprises antenna 450, sweep circuits 451 and 452, frequency change controllers 453 and 454, diversity demodulator 455, error correction decoder 456 and voice decoder 457.

Third mobile station 403 comprises antenna 460, sweep circuits 461 and 462, frequency change controllers 463 and 464, diversity combination demodulator 465, error correction decoder 466 and voice decoder 467.

The operation of the transmission/reception apparatus configured as shown above is explained. This example illustrates a case with three users each using two subcarriers to carry out multi-carrier transmissions. This is an example where a signal is transmitted from base station 400 to mobile stations 401 to 403, but transmission of a signal from mobile stations 401 to 403 to base station 400 is also the same operation.

First, in base station 400, for first mobile station 401, a digital signal created by voice encoder 410 is encoded with error correction by error correction encoder 413, modulated by modulator 416, and then branched off in two directions.

In one branch, the central frequency of the signal is changed by sweep circuit 419 according to a first sweep pattern created by frequency change controller 425. In the other branch, the central frequency of the signal is changed by sweep circuit 420 according to a second sweep pattern which is different from the other created by frequency change controller 426.

At this time, frequency control allocator 431 controls frequency change controllers 425 and 426 to generate the first and second sweep patterns so that the central frequencies of the signals to be swept do not overlap. This allows a same signal to be carried on two subcarriers with central frequencies of different patterns and at the same prevents both subcarriers from overlapping.

For second mobile station 402, a digital signal created by voice encoder 411 is encoded with error correction by error correction encoder 414, modulated by modulator 417 and then branched off in two directions.

In one branch, the central frequency of the signal is changed by sweep circuit 421 according to a third sweep pattern which is different from the others created by frequency change controller 427. In the other branch, the central frequency of the signal is changed by sweep circuit 422 according to a fourth sweep pattern which is different from the others created by frequency change controller 428.

At this time, frequency control allocator 432 controls frequency change controllers 427 and 428 to generate the third and fourth sweep patterns so that the central frequencies of the signals to be swept do not overlap.

For third mobile station 403, a digital signal created by voice encoder 412 is encoded with error correction by error correction encoder 415, modulated by modulator 418 and then branched off in two directions.

In one branch, the central frequency of the signal is changed by sweep circuit 423 according to a fifth sweep pattern which is different from the others created by frequency change controller 429. In the other branch, the central frequency of the signal is changed by sweep circuit 424 according to a sixth sweep pattern which is different from the others created by frequency change controller 430.

At this time, frequency control allocator 433 controls frequency change controllers 429 and 430 to generate the fifth and sixth sweep patterns so that the central frequencies of the signals to be swept do not overlap.

The signals changed with their respective sweep patterns are summed up by adder 434, amplified by amplifier 435 and emitted from antenna 436. Here, the signal emitted from antenna 436 is a mixture of signals directed to mobile stations 401 to 403, but they have been changed with mutually different sweep patterns, and thus mobile stations 401 to 403 each can receive only the corresponding signal by receiving it with the same sweep pattern as that of the base station.

First mobile station 401, after receiving a signal by antenna 440, extracts a first desired signal by sweeping it using sweep circuit 441 according to the same first sweep pattern as that on the transmitting side created by frequency change controller 443, extracts a second desired signal by sweeping it using sweep circuit 442 according to the same second sweep pattern as that on the transmitting side created by frequency change controller 444. Then, the signals are demodulated by diversity combination demodulator 445, subjected to error correction by error correction decoder 446 and their voice is reproduced by voice decoder 447.

Second mobile station 402, after receiving a signal by antenna 450, extracts a first desired signal by sweeping it using sweep circuit 451 according to the same third sweep pattern as that on the transmitting side created by frequency change controller 453, extracts a second desired signal by sweeping it using sweep circuit 452 according to the same fourth sweep pattern as that on the transmitting side created by frequency change controller 454. Then, the signals are demodulated by diversity combination demodulator 455, subjected to error correction by error correction decoder 456 and their voice is reproduced by voice decoder 457.

Third mobile station 403, after receiving a signal by antenna 460, extracts a first desired signal by sweeping it using sweep circuit 461 according to the same fifth sweep pattern as that on the transmitting side created by frequency change controller 463, extracts a second desired signal by sweeping it using sweep circuit 462 according to the same sixth sweep pattern as that on the transmitting side created by frequency change controller 464. Then, the signals are demodulated by diversity combination demodulator 465, subjected to error correction by error correction decoder 466 and their voice is reproduced by voice decoder 467.

As shown above, according to Embodiment 4, mobile stations 401 to 403 can demodulate a desired signal by base station 400 providing different frequency changes according to the mobile stations and their subcarriers.

Even if signals to a plurality of mobile stations 401 to 403 overlap, each central frequency is shifted causing the amount of interference to be variable with time, and thus the signal quality can be maintained by combining with error correction and interleaving, etc.

Furthermore, the present embodiment prevents a plurality of signals of a same user from overlapping, enabling transmission of data with better quality than Embodiment 3.

This makes it possible to achieve multiple access with a same frequency resource used by a plurality of users.

(Embodiment 5)

Figure 6:
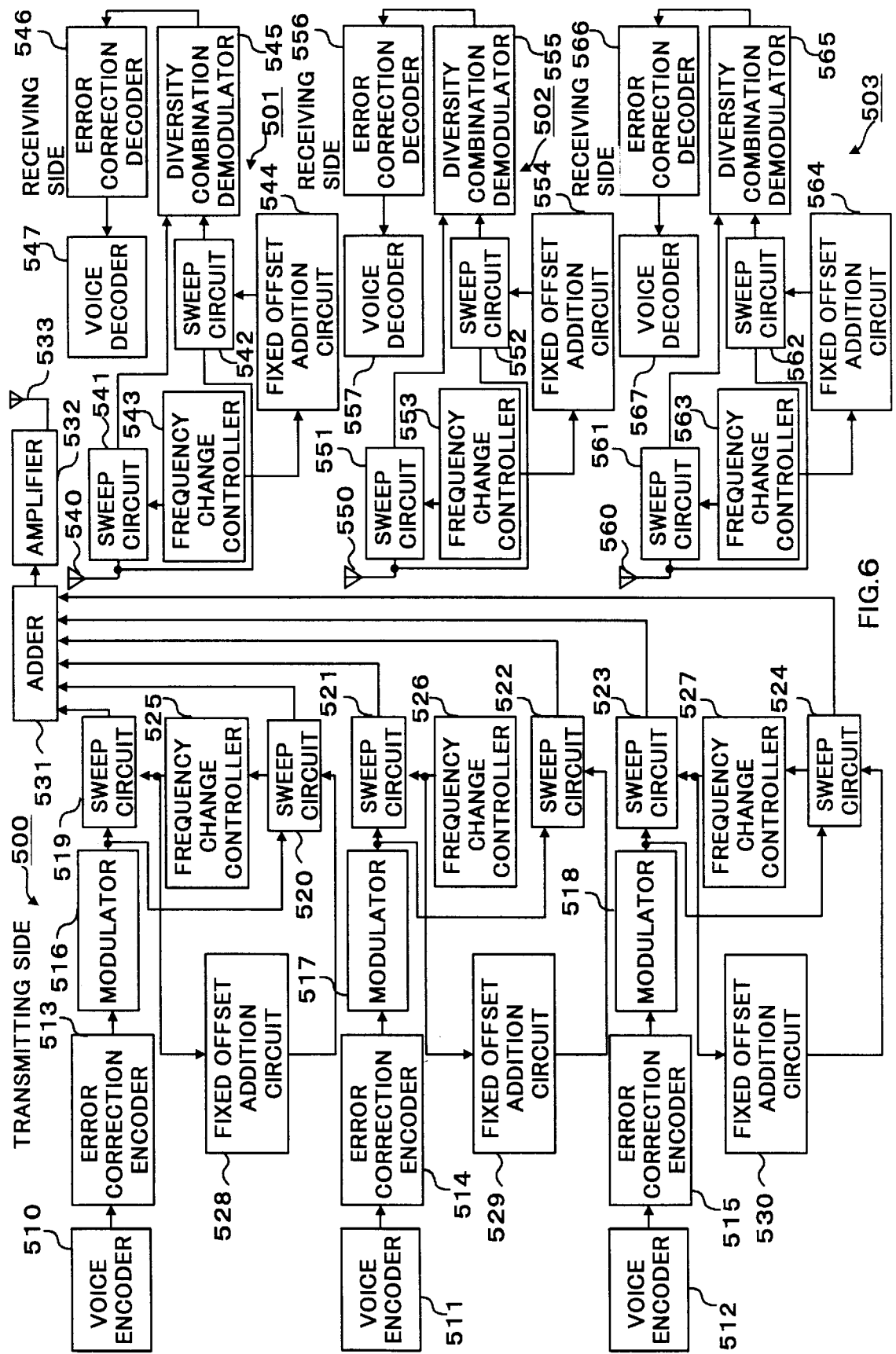
FIG. 6 is a block diagram showing the configuration of a transmission/reception apparatus according to Embodiment 5 of the present invention.

FIG. 6 is a block diagram showing the configuration of a transmission/reception apparatus according to Embodiment 5 of the present invention. Here, suppose that the transmission apparatus is a base station and the reception apparatuses are mobile stations in a mobile communication system.

A feature of Embodiment 5 is that overlapping of signals of a same user can easily be prevented by changing their central frequencies with a same sweep pattern with a fixed offset in Embodiment 3.

In FIG. 6, 500 represents a base station and 501 to 503 represent a first to third mobile stations. In this example, base station 500 is provided with communication circuits for three mobile stations, comprising voice encoders 510 to 512, error correction encoders 513 to 515, modulators 516 to 518, sweep circuits 519 to 524, frequency change controllers 525 to 527, fixed offset addition circuits 528 to 530, adder 531, amplifier 532 and antenna 533.

First mobile station 501 comprises antenna 540, sweep circuits 541 and 542, frequency change controller 543, fixed offset addition circuit 544, diversity combination demodulator 545, error correction decoder 546 and voice decoder 547.

Second mobile station 502 comprises antenna 550, sweep circuits 551 and 552, frequency change controller 553, fixed offset addition circuit 554, diversity demodulator 555, error correction decoder 556 and voice decoder 557.

Third mobile station 503 comprises antenna 560, sweep circuits 561 and 562, frequency change controller 563, fixed offset addition circuit 564, diversity combination demodulator 565, error correction decoder 566 and voice decoder 567.

The operation of the transmission/reception apparatus configured as shown above is explained. This example illustrates a case with three users each using two subcarriers to carry out multi-carrier transmissions. This is an example where a signal is transmitted from base station 500 to mobile stations 501 to 503, but transmission of a signal from mobile stations 501 to 503 to base station 500 is also the same operation.

First, in base station 500, for first mobile station 501, a digital signal created by voice encoder 510 is encoded with error correction by error correction encoder 513, modulated by modulator 516, and then branched off in two directions.

In one branch, the central frequency of the signal is changed by sweep circuit 519 according to a first sweep pattern created by frequency change controller 525. In the other branch, the central frequency of the signal is changed by sweep circuit 520 according to a second sweep pattern which is the first sweep pattern with an offset added by fixed offset addition circuit 528.

This allows the same signal to be carried on two subcarriers with central frequencies of different patterns and at the same prevents both subcarriers from overlapping.

For second mobile station 502, a digital signal created by voice encoder 511 is encoded with error correction by error correction encoder 514, modulated by modulator 517 and then branched off in two directions.

In one branch, the central frequency of the signal is changed by sweep circuit 521 according to a third sweep pattern which is different from the others created by frequency change controller 526. In the other branch, the central frequency of the signal is changed by sweep circuit 522 according to a fourth sweep pattern which is the third sweep pattern with an offset added by fixed offset addition circuit 529.

For third mobile station 503, a digital signal created by voice encoder 512 is encoded with error correction by error correction encoder 515, modulated by modulator 518 and then branched off in two directions.

In one branch, the central frequency of the signal is changed by sweep circuit 523 according to a fifth sweep pattern which is different from the others created by frequency change controller 529. In the other branch, the central frequency of the signal is changed by sweep circuit 524 according to a sixth sweep pattern which is the fifth sweep pattern with an offset added by fixed offset addition circuit 530.

Here, the amount of offset that fixed offset addition circuits 528 to 530 give to sweep patterns may be the same or maybe different among the mobile stations.

The signals changed with their respective sweep patterns are summed up by adder 531, amplified by amplifier 532 and emitted from antenna 533. Here, the signal emitted from antenna 533 is a mixture of signals directed to a plurality of mobile stations 501 to 503, but they have been changed with mutually different sweep patterns, and thus mobile stations 501 to 503 each can receive only the corresponding signal by receiving it with the same sweep pattern as that of the base station.

First mobile station 501, after receiving a signal by antenna 540, extracts a first desired signal by sweeping it using sweep circuit 541 according to the same first sweep pattern as that on the transmitting side created by frequency change controller 543, extracts a second desired signal by sweeping it using sweep circuit 542 according to the second sweep pattern which is the first sweep pattern with the same offset as on the transmitting side added by fixed offset addition circuit 544. Then, the signals are demodulated by diversity combination demodulator 545, subjected to error correction by error correction decoder 546 and their voice is reproduced by voice decoder 547.

Second mobile station 502, after receiving a signal by antenna 550, extracts a first desired signal by sweeping it using sweep circuit 551 according to the same third sweep pattern as that on the transmitting side created by frequency change controller 553, extracts a second desired signal by sweeping it using sweep circuit 552 according to a fourth sweep pattern which is the third sweep pattern with the same offset as on the transmitting side added by fixed offset addition circuit 554. Then, the signals are demodulated by diversity combination demodulator 555, subjected to error correction by error correction decoder 556 and their voice is reproduced by voice decoder 557.

Third mobile station 503, after receiving a signal by antenna 560, extracts a first desired signal by sweeping it using sweep circuit 561 according to the same fifth sweep pattern as that on the transmitting side created by frequency change controller 563, extracts a second desired signal by sweeping it using sweep circuit 562 according to the sixth sweep pattern which is the fifth sweep pattern with the same offset as on the transmitting side added by fixed offset addition circuit 564. Then, the signals are demodulated by diversity combination demodulator 565, subjected to error correction by error correction decoder 566 and their voice is reproduced by voice decoder 567.

As shown above, according to Embodiment 5, mobile stations 501 to 503 can demodulate a desired signal by base station 500 providing different frequency changes according to the mobile stations and their subcarriers.

Even if signals to a plurality of mobile stations 501 to 503 overlap, each central frequency is shifted causing the amount of interference to be variable with time, and thus the signal quality can be maintained by combining with error correction and interleaving, etc.

Furthermore, the present embodiment prevents a plurality of signals of a same user from overlapping, enabling transmission of data with better quality than Embodiment 3. In this case, Embodiment 5 can perform control to prevent subcarriers from overlapping by adding a fixed frequency offset between subcarriers, more easily than Embodiment 4. This makes it possible to achieve multiple access with a same frequency resource used by a plurality of users.

(Embodiment 6)

Figure 7:
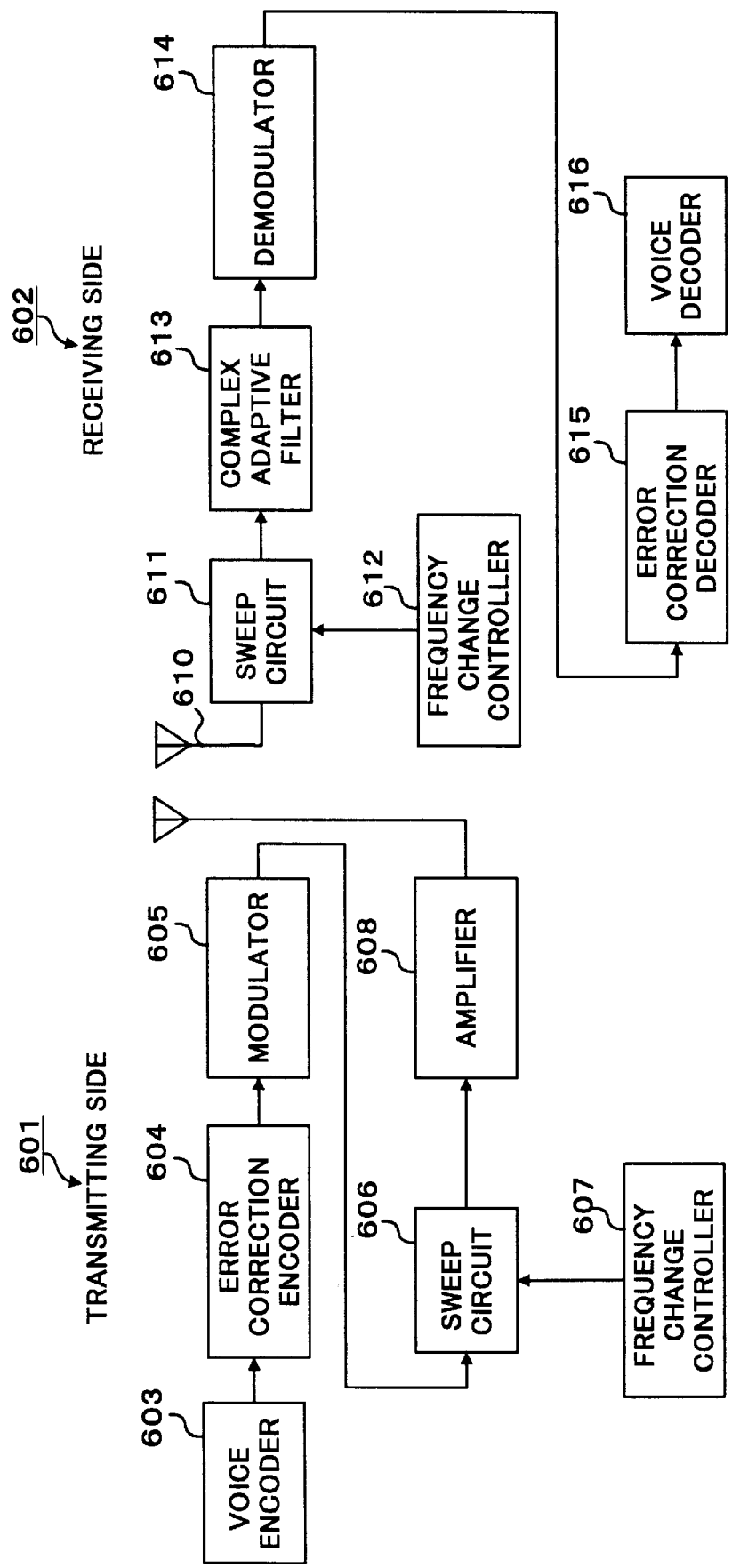
FIG. 7 is a block diagram showing the configuration of a transmission/reception apparatus according to Embodiment 6 of the present invention.

FIG. 7 is a block diagram showing the configuration of a transmission/reception apparatus according to Embodiment 6 of the present invention. Here, suppose that the transmission apparatus is a base station and the reception apparatus is a mobile station in a mobile communication system.

A feature of Embodiment 7 is that S/N can be improved by providing a complex adaptive filter for the reception apparatus.

In FIG. 7, 601 represents a base station and 602 represents a mobile station. Base station 601 comprises voice encoder 603, error correction encoder 604, modulator 605, sweep circuit 606, frequency change controller 607, amplifier 608 and antenna 609.

Mobile station 602 comprises antenna 610, sweep circuit 611, frequency change controller 612, complex adaptive filter 613, demodulator 614, error correction decoder 615 and voice decoder 616.

In the transmission/reception apparatus configured as shown above, base station 601 performs error correction encoding on the digital data created by voice encoder 603 using error correction encoder 604, modulates it by modulator 605 and sweeps its central frequency by sweep circuit 606. The sweep pattern at this time is generated by frequency change controller 607. The swept signal is amplified by amplifier 608 and emitted from antenna 609.

Mobile station 602 receives a signal from base station 601 through antenna 610 and detects it while sweeping its central frequency using sweep circuit 611. Suppose that the sweep pattern at this time is generated by frequency change controller 612 and the pattern is the same as that generated by frequency change controller 607 of base station 601.

For the detected signal, S/N is improved by complex adaptive filter 613, then the signal is demodulated by demodulator 614, error-corrected by error correction decoder 615 and its voice is reproduced by voice decoder 616.

As shown above, Embodiment 6 can correctly transmit signals by performing sweeping with a same pattern between the transmitting and receiving sides. Furthermore, complex adaptive filter 613 changes this adaptively and if a signal of another mobile station overlaps within the band of a desired signal it can form such a matched filter that provides an optimum S/N at that time, enabling better transmission than Embodiment 1.

The present embodiment can also be implemented easily with complicated sweep patterns and complex filter control by using digital signal processing after performing a wideband sampling in actual practice.

(Embodiment 7)

Figure 8:
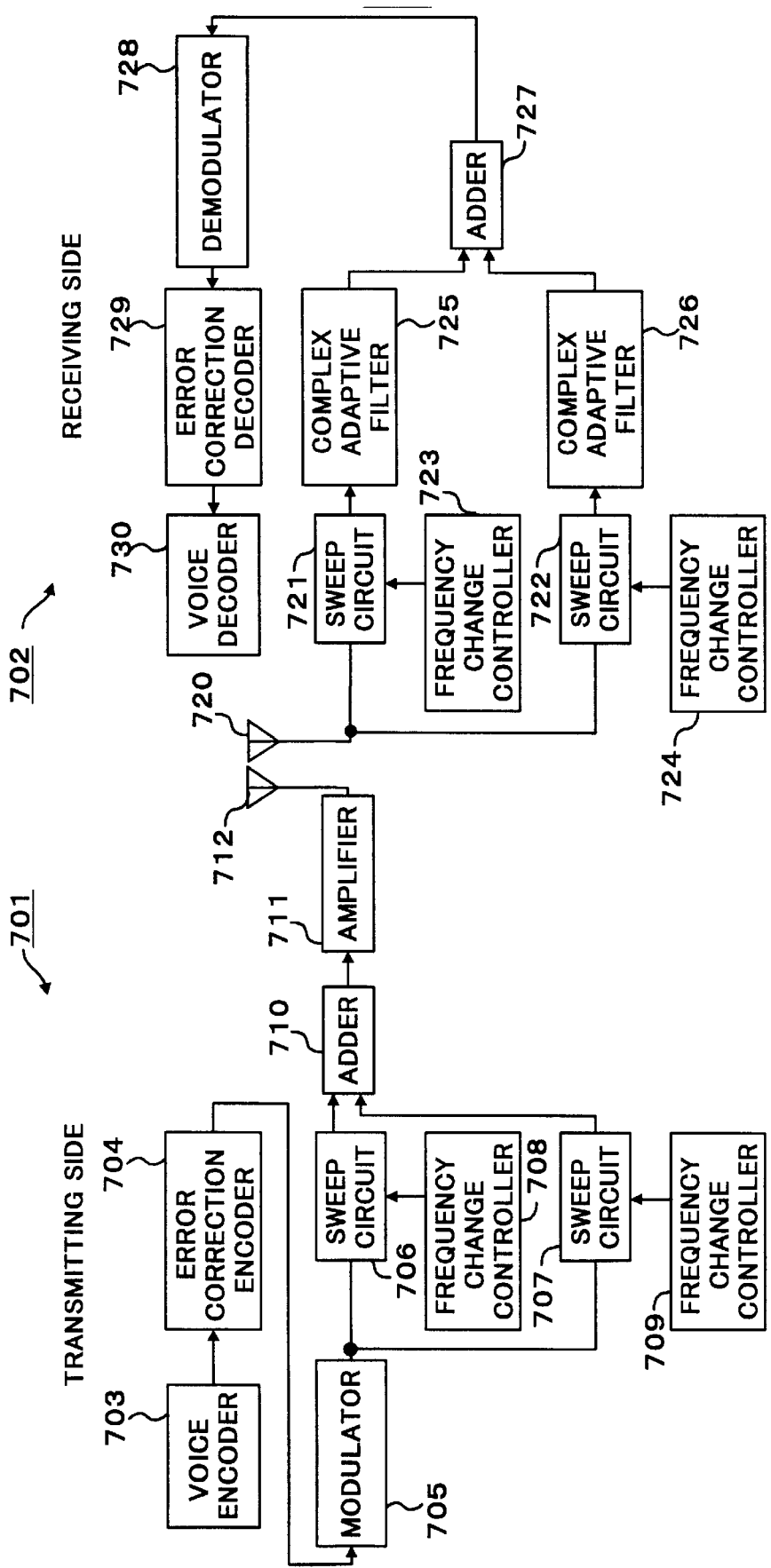
FIG. 8 is a block diagram showing the configuration of a transmission/reception apparatus according to Embodiment 7 of the present invention.

FIG. 8 is a block diagram showing the configuration of a transmission/reception apparatus according to Embodiment 7 of the present invention. Here, suppose that the transmission apparatus is a base station and the reception apparatus is a mobile station in a mobile communication system.

A feature of Embodiment 7 is that frequency diversity and S/N can be improved simultaneously by filtering a plurality of frequency band signals in Embodiment 6 through a complex adaptive filter.

In FIG. 8, 701 represents a base station and 702 represents a mobile station. Base station 701 comprises voice encoder 703, error correction encoder 704, modulator 705, sweep circuits 706 and 707, frequency change controllers 708 and 709, adder 710, amplifier 711 and antenna 712.

Mobile station 702 comprises antenna 720, sweep circuits 721 and 722, frequency change controllers 723 and 724, complex adaptive filters 725 and 726, adder 727, demodulator 728, error correction decoder 729 and voice decoder 730.

The operation of the transmission/reception apparatus configured as shown above is explained. This example illustrates a case with multi-carrier transmissions using two subcarriers.

First, in base station 701, a digital signal created by voice encoder 703 is encoded with error correction by error correction encoder 704, modulated by modulator 705 and then branched off in two directions.

In one branch, the central frequency of the signal is changed by sweep circuit 706 according to a first sweep pattern created by frequency change controller 708. In the other branch, the central frequency of the signal is changed by sweep circuit 707 according to a second sweep pattern which is different from the other created by frequency change controller 709. The signals changed with their respective sweep patterns are summed up by adder 710, amplified by amplifier 711 and emitted from antenna 712.

Mobile station 702, after receiving a signal by antenna 720, extracts a first desired signal by sweeping it using sweep circuit 721 according to the same first sweep pattern as that on the transmitting side created by frequency change controller 723, extracts a second desired signal by sweeping it using sweep circuit 722 according to the same second sweep pattern as that on the transmitting side created by frequency change controller 724.

For these extracted signals, S/N is improved by complex adaptive filters 725 and 726, and then the signals are summed up by adder 727. Here, complex adaptive filters 725 and 726 are controlled together with adder 727 so that a maximum S/N may be obtained after the addition. If signals for other mobile stations do not overlap, this processing is equivalent to a maximum ratio combination.

Then, the resulting signal is demodulated by demodulator 728, error-corrected by error correction decoder 729 and its voice is reproduced by voice decoder 730.

As shown above, Embodiment 7 can correctly transmit signals by performing sweeping with a same pattern between the transmitting and receiving sides. Furthermore, complex adaptive filters 725 and 726 change this adaptively and if signals of other mobile stations overlap within the band of a desired signal they can form such matched filters that provides an optimum S/N at that time, enabling better transmission than Embodiment 1.

Furthermore, the present embodiment can improve S/N using a plurality of subcarriers, enabling better transmission than Embodiment 6.

The present embodiment can also be implemented easily with complicated sweep patterns and complex filter control by using digital signal processing after performing a wideband sampling in actual practice.

(Embodiment 8)

Figure 9:
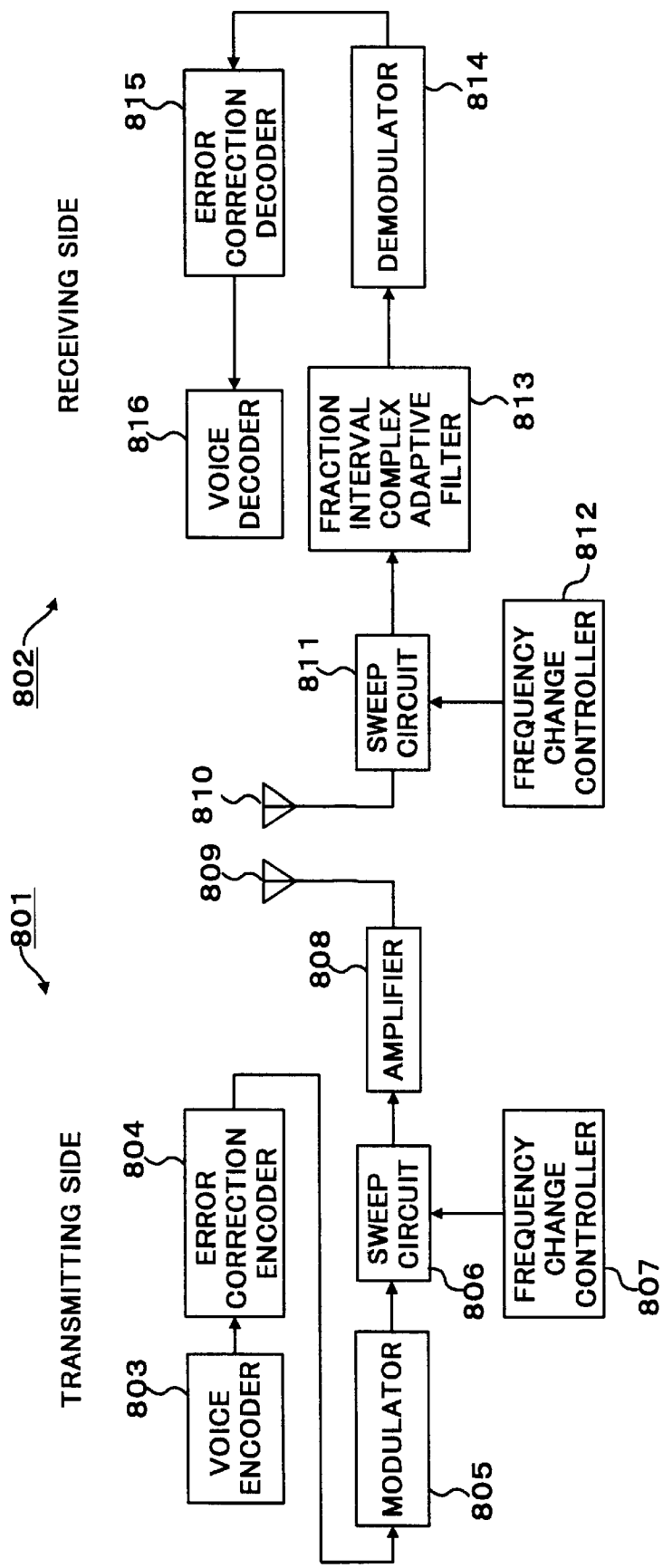
FIG. 9 is a block diagram showing the configuration of a transmission/reception apparatus according to Embodiment 8 of the present invention.

FIG. 9 is a block diagram showing the configuration of a transmission/reception apparatus according to Embodiment 8 of the present invention. Here, suppose that the transmission apparatus is a base station and the reception apparatus is a mobile station in a mobile communication system.

A feature of Embodiment 8 is that it is possible not only to improve S/N but also to automate symbol synchronization by setting the tap interval of the complex adaptive filters in Embodiment 6 or 7 to an fraction of the symbol time.

In FIG. 9, 801 represents a base station and 802 represents a mobile station. Base station 801 comprises voice encoder 803, error correction encoder 804, modulator 805, sweep circuit 806, frequency change controller 807, amplifier 808 and antenna 809.

Mobile station 802 comprises antenna 810, sweep circuit 811, frequency change controller 812, fraction interval complex adaptive filter 813, demodulator 814, error correction decoder 815 and voice decoder 816.

In the transmission/reception apparatus configured as shown above, in base station 801, a digital signal created by voice encoder 803 is encoded with error correction by error correction encoder 804, modulated by modulator 805 and its central frequency is swept by sweep circuit 806. The sweep pattern at this time is generated by frequency change controller 807. The swept signal is amplified by amplifier 808 and emitted from antenna 809.

Mobile station 802 receives a signal from base station 801 through antenna 810 and detects the signal by sweeping the central frequency by sweep circuit 811. The sweep pattern at this time is generated by frequency change controller 812 and the pattern is the same as that generated by frequency change controller 807 of base station 801.

For the detected signal, S/N is improved by fraction interval complex-adaptive filter 813 and a difference in the sampling time is compensated simultaneously and then demodulated by demodulator 814, error-corrected by error correction decoder 815 and its voice is reproduced by voice decoder 816.

As shown above, Embodiment 8 can correctly transmit signals by performing sweeping with a same pattern between the transmitting and receiving sides. Furthermore, fraction interval complex adaptive filter 813 changes this adaptively and if signals of other mobile stations overlap within the band of a desired signal it can form such a matched filter that provides an optimum S/N at that time, enabling better transmission than Embodiment 1. In addition, it can compensate a difference in the sampling timing by fraction interval filter 813, establishing synchronization more easily than Embodiment 6.

The present embodiment can also be implemented easily with complicated sweep patterns and complex filter control by using digital signal processing after performing a wideband sampling in actual practice.

(Embodiment 9)

Figure 10:
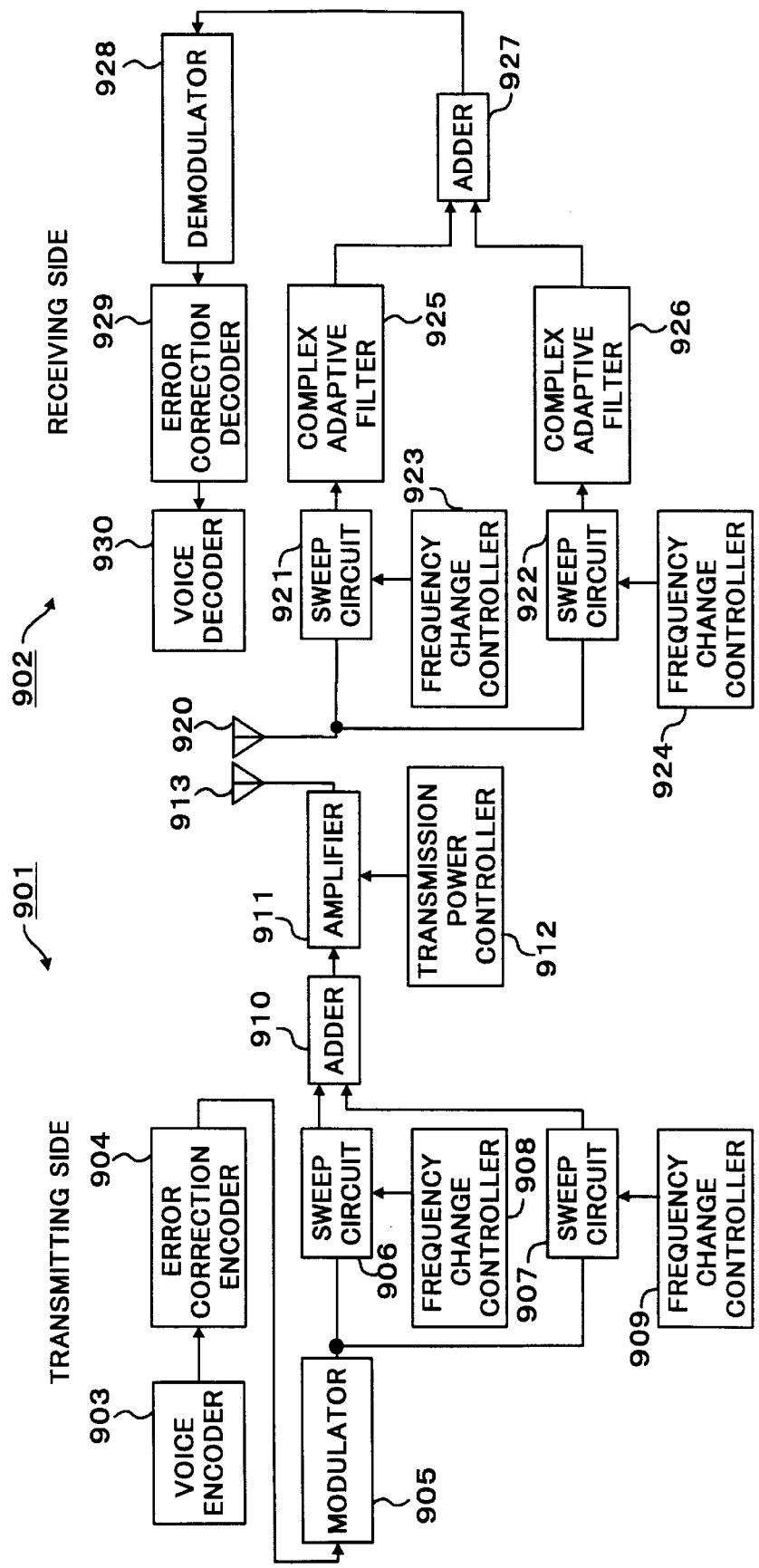
FIG. 10 is a block diagram showing the configuration of a transmission/reception apparatus according to Embodiment 9 of the present invention.

FIG. 10 is a block diagram showing the configuration of a transmission/reception apparatus according to Embodiment 9 of the present invention. Here, suppose that the transmission apparatus is a base station and the reception apparatus is a mobile station in a mobile communication system.

A feature of Embodiment 9 is that power capacity can be increased by transmission power control.

In FIG. 10, 901 represents a base station and 902 represents a mobile station. Base station 901 comprises voice encoder 903, error correction encoder 904, modulator 905, sweep circuits 906 and 907, frequency change controllers 908 and 909, adder 910, amplifier 911, transmission power controller 912 and antenna 913.

Mobile station 902 comprises antenna 920, sweep circuits 921 and 922, frequency change controllers 923 and 924, complex adaptive filters 925 and 926, adder 927, demodulator 928, error correction decoder 929 and voice decoder 930.

The operation of the transmission/reception apparatus configured as shown above is explained. Here, this example illustrates multi-carrier transmissions using two subcarriers. In base station 901, a digital signal created by voice encoder 903 is encoded with error correction by error correction encoder 904, modulated by modulator 905, then branched off in two directions.

In one branch, the central frequency of the signal is changed by sweep circuit 906 according to a first sweep pattern created by frequency change controller 908. In the other branch, the central frequency of the signal is changed by sweep circuit 907 according to a second sweep pattern which is different from the other created by frequency change controller 909.

The signals changed with their respective sweep patterns are summed up by adder 910 and amplified by amplifier 911. At this time, the amplification factor of amplifier 911 is controlled by transmission power controller 912 so that transmission may be performed with a minimum necessary level of power and then the signal is emitted from antenna 913.

Mobile station 902, after receiving a signal by antenna 920, extracts a first desired signal by sweeping it using sweep circuit 921 according to the same first sweep pattern as that on the transmitting side created by frequency change controller 923, extracts a second desired signal by sweeping it using sweep circuit 922 according to the same second sweep pattern as that on the transmitting side created by frequency change controller 924.

For these extracted signals, S/N is improved by complex adaptive filters 925 and 926, and then the signals are summed up by adder 927. Here, complex adaptive filters 925 and 926 are controlled together with adder 927 so that a maximum S/N may be obtained after the addition. If signals for other mobile stations do not overlap, this processing is equivalent to a maximum ratio combination.

Then, the signal is demodulated by demodulator 928, error-corrected by error correction decoder 929 and voice is reproduced by voice decoder 930.

As shown above, Embodiment 9 can correctly transmit signals by performing sweeping with a same pattern between the transmitting and receiving sides. Furthermore, complex adaptive filters 925 and 926 change this adaptively and if signals of other mobile stations overlap within the band of a desired signal it can form such a matched filter that provides an optimum S/N at that time, enabling better transmission than Embodiment 1. Furthermore, it can improve S/N using a plurality of subcarriers, enabling better transmission than Embodiment 6.

Furthermore, it can reduce interference with signals of other mobile stations by transmitting signals with a minimum necessary level of power for each mobile station using transmission power controller 912, enabling improvement of the system capacity more than Embodiment 7. The present embodiment can also be implemented easily with complicated sweep patterns and complex filter control by using digital signal processing after performing a wideband sampling in actual practice.

(Embodiment 10)

Figure 11:
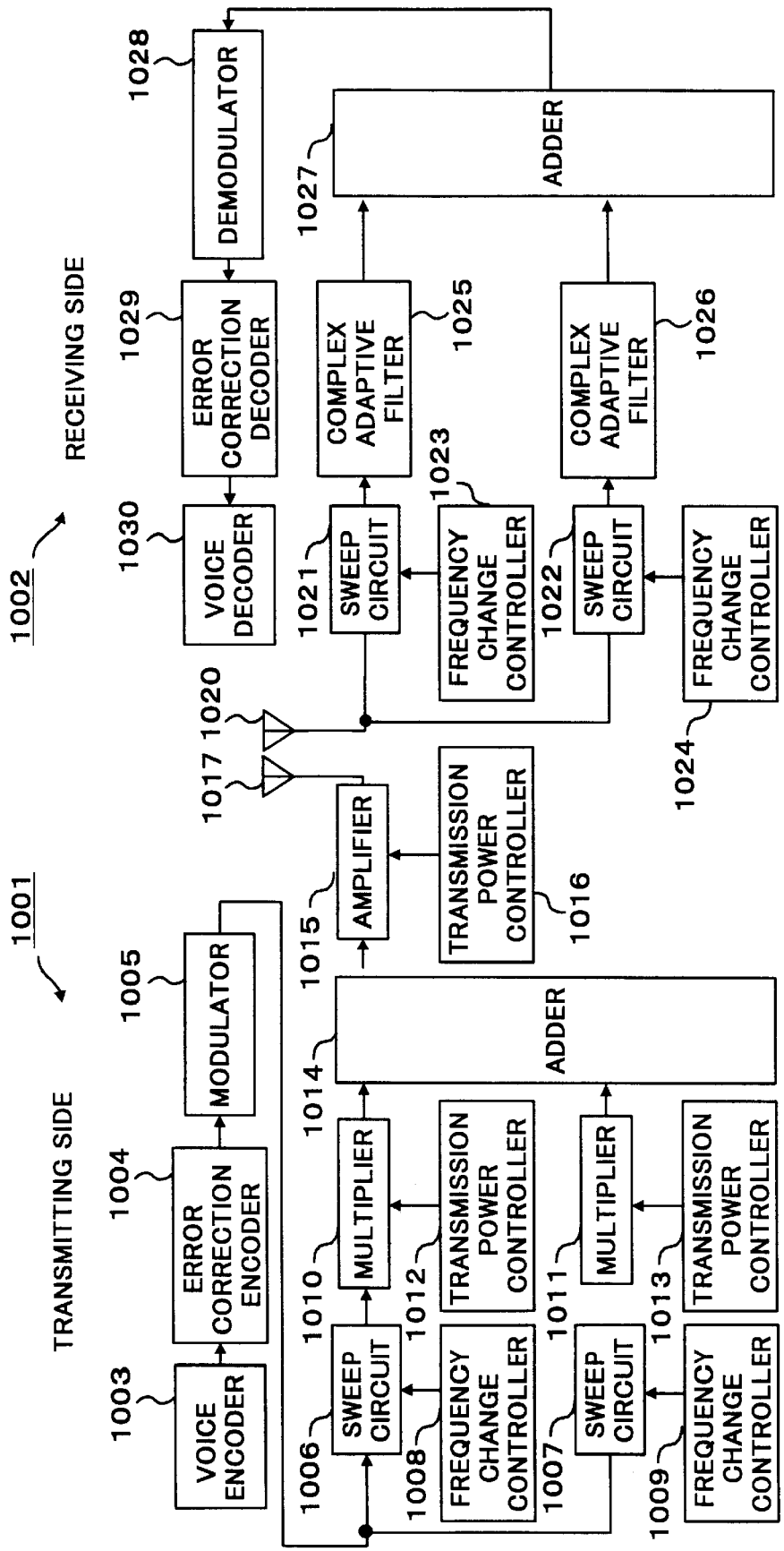
FIG. 11 is a block diagram showing the configuration of a transmission/reception apparatus according to Embodiment 10 of the present invention.

FIG. 11 is a block diagram showing the configuration of a transmission/reception apparatus according to Embodiment 10 of the present invention. Here, suppose that the transmission apparatus is a base station and the reception apparatus is a mobile station in a mobile communication system.

A feature of Embodiment 10 is that a reduction of transmission power and increase of capacity are achieved by individually performing transmission power control for each carrier in Embodiment 9.

In FIG. 11, 1001 represents a base station and 1002 represents a mobile station. Base station 1001 comprises voice encoder 1003, error correction encoder 1004, modulator 1005, sweep circuits 1006 and 1007, frequency change controllers 1008 and 1009, multipliers 1010 and 1011, transmission power controllers 1012 and 1013, adder 1014, amplifier 1015, transmission power controller 1016 and antenna 1017.

Mobile station 1002 comprises antenna 1020, sweep circuits 1021 and 1022, frequency change controllers 1023 and 1024, complex adaptive filters 1025 and 1026, adder 1027, demodulator 1028, error correction decoder 1029 and voice decoder 1030.

The operation of the transmission/reception apparatus configured as shown above is explained. Here, this example illustrates multi-carrier transmissions using two subcarriers. In base station 1001, a digital signal created by voice encoder 1003 is encoded with error correction by error correction encoder 1004, modulated by modulator 1005, then branched off in two directions.

In one branch, the central frequency of the signal is changed by sweep circuit 1006 according to a first sweep pattern created by frequency change controller 1008. In the other branch, the central frequency of the signal is changed by sweep circuit 1007 according to a second sweep pattern which is different from the other created by frequency change controller 1009.

The amplitudes of the signals changed with their respective sweep patterns are controlled by multipliers 1010 and 1011 under the control of transmission power controllers 1012 and 1013, respectively. This control allows individual transmission power control for each subcarrier. After this control, the signals are summed up by adder 1014 and amplified by amplifier 1015. At this time, the amplification factor of amplifier 1015 is controlled by transmission power controller 1016 so that transmission may be performed with a minimum necessary level of power and then the signal is emitted from antenna 1017.

Mobile station 1002, after receiving a signal by antenna 1020, extracts a first desired signal by sweeping it using sweep circuit 1021 according to the same first sweep pattern as that on the transmitting side created by frequency change controller 1023, extracts a second desired signal by sweeping it using sweep circuit 1022 according to the same second sweep pattern as that on the transmitting side created by frequency change controller 1024.

For these extracted signals, S/N is improved by complex adaptive filters 1025 and 1026, and then the signals are summed up by adder 1027. Here, complex adaptive filters 1025 and 1026 are controlled together with adder 1027 so that a maximum S/N may be obtained after the addition. If signals for other mobile stations do not overlap, this processing is equivalent to a maximum ratio combination.

Then, the signal is demodulated by demodulator 1028, error-corrected by error correction decoder 1029 and voice is reproduced by voice decoder 1030.

As shown above, Embodiment 10 can correctly transmit signals by performing sweeping with a same pattern between the transmitting and receiving sides. Furthermore, complex adaptive filters 1025 and 1026 change this adaptively and if signal of other mobile stations overlap within the band of a desired signal it can form such a matched filter that provides an optimum S/N at that time, enabling better transmission than Embodiment 1. Furthermore, it can improve S/N using a plurality of subcarriers, enabling better transmission than Embodiment 6.

Furthermore, it can reduce interference with signals of other mobile stations by transmitting signals with a minimum necessary level of power for each mobile station using transmission power controllers 1012 and 1013, enabling improvement of the system capacity more than Embodiment 7. In addition, the present embodiment enables improvement of the system capacity more than Embodiment 9 by performing individual transmission power control for each subcarrier. The present embodiment can also be implemented easily with complicated sweep patterns and complex filter control by using digital signal processing after performing a wideband sampling in actual practice.

(Embodiment 11)

Figure 12:
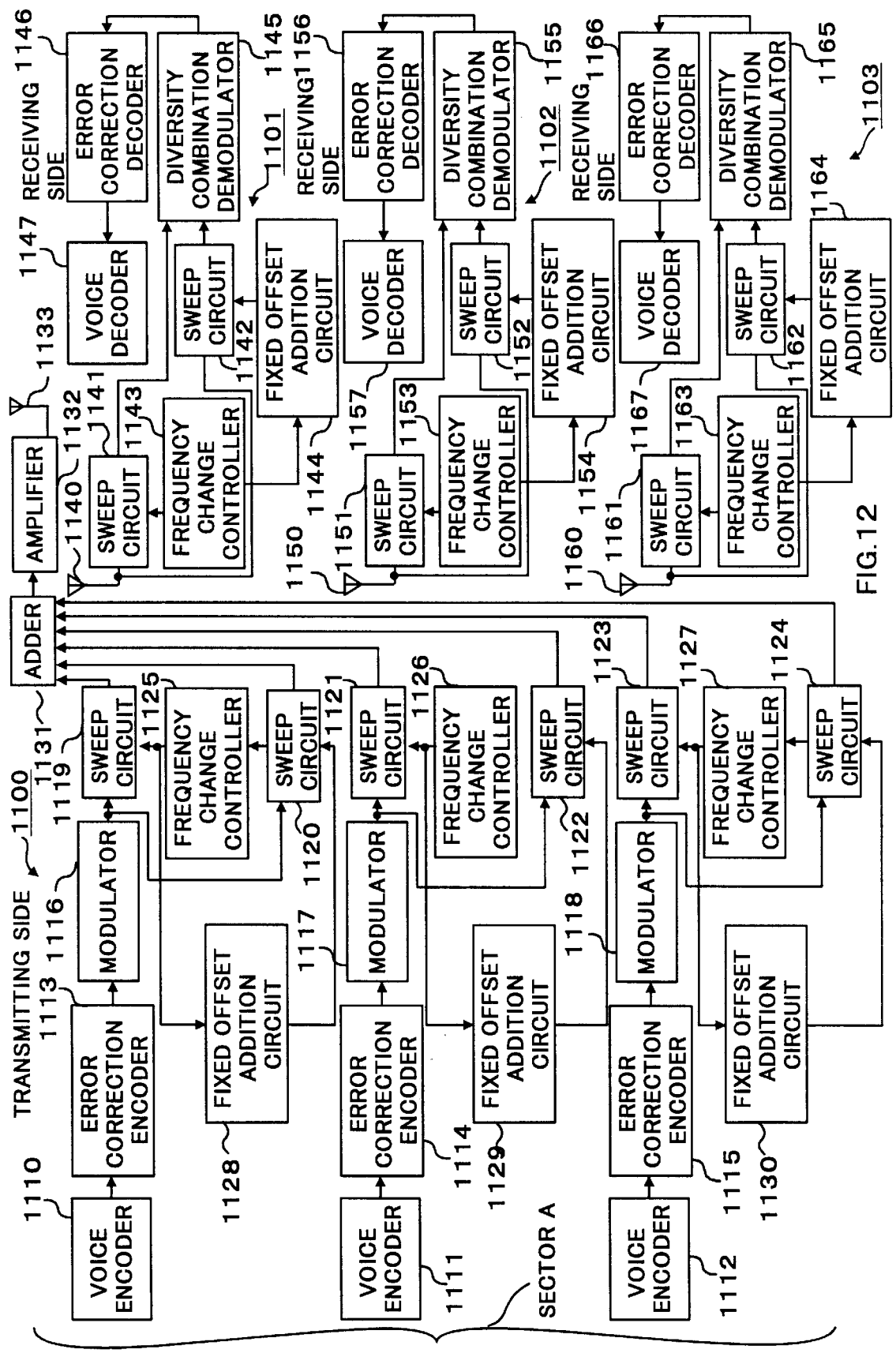
FIG. 12 is a block diagram showing the configuration of a transmission/reception apparatus in sector A according to Embodiment 11 of the present invention.
Figure 13:
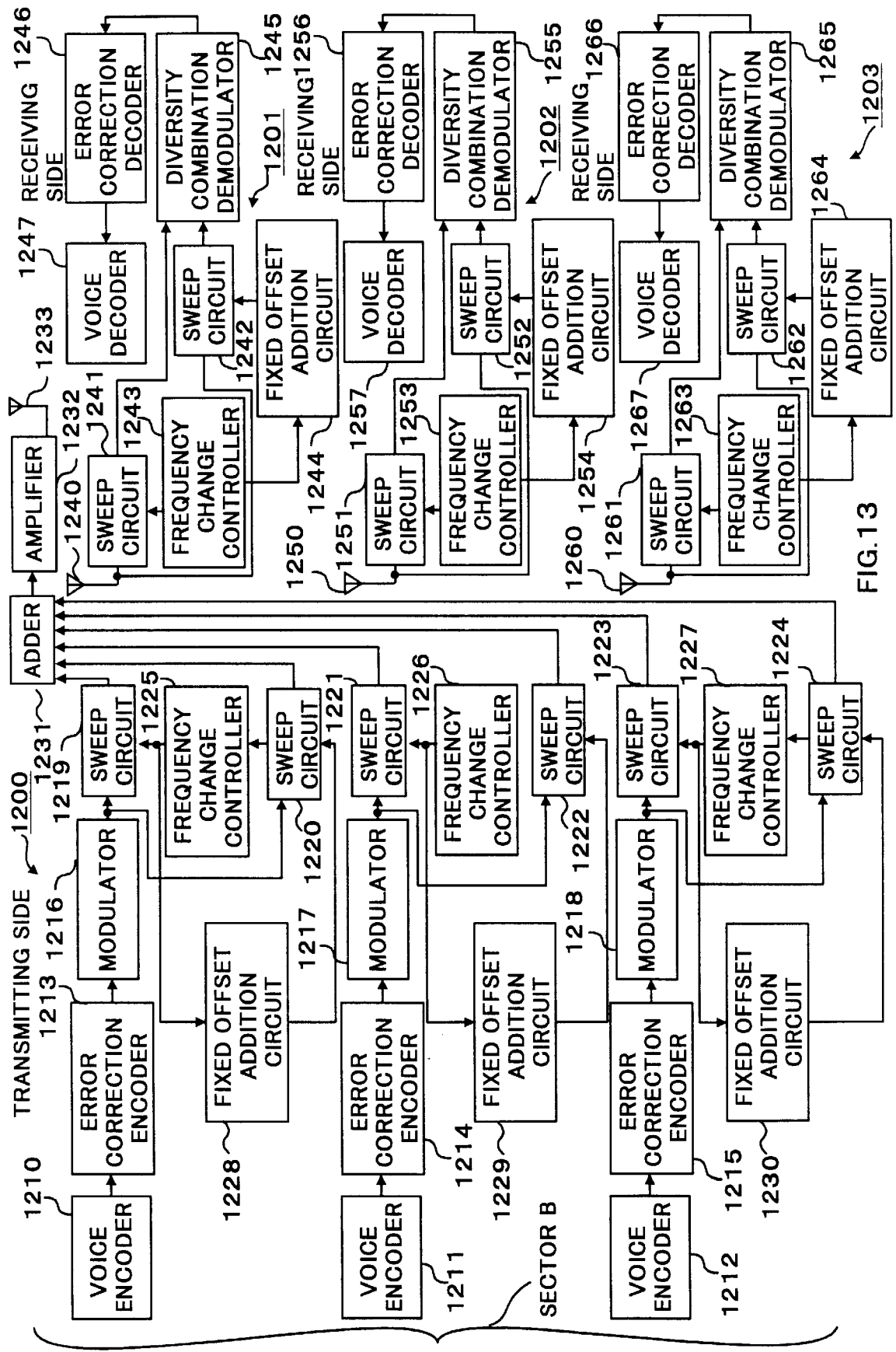
FIG. 13 is a block diagram showing the configuration of a transmission/reception apparatus in sector B according to Embodiment 11 of the present invention.

FIG. 12 is a block diagram showing the configuration of a sector A transmission/reception apparatus according to Embodiment 11 of the present invention and FIG. 13 is a block diagram showing the configuration of a sector B transmission/reception apparatus according to Embodiment 11 of the present invention. Here, suppose that the transmission apparatus is a base station and the reception apparatuses are mobile stations in a mobile communication system.

A feature of Embodiment 11 is that using a set of carrier offsets specific to users and dependent on the sector (here, the radio wave area of the base station) as sweep patterns allows sector identification and soft handover that forms an environment allowing a mobile station to move gradually by a plurality of base stations together transmitting waves to the mobile station.

In FIG. 12, 1100 represents a first base station and 1101 to 1103 represent a first to third mobile stations. In this example, first base station 1100 is provided with communication circuits for three mobile stations, comprising voice encoders 1110 to 1112, error correction encoders 1113 to 1115, modulators 1116 to 1118, sweep circuits 1119 to 1124, frequency change controllers 1125 to 1127, fixed offset addition circuits 1128 to 1130, adder 1131, amplifier 1132 and antenna 1133.

First mobile station 1101 comprises antenna 1140, sweep circuits 1141 and 1142, frequency change controller 1143, fixed offset addition circuit 1144, diversity combination demodulator 1145, error correction decoder 1146 and voice decoder 1147.

Second mobile station 1102 comprises antenna 1150, sweep circuits 1151 and 1152, frequency change controller 1153, fixed offset addition circuit 1154, diversity combination demodulator 1155, error correction decoder 1156 and voice decoder 1157.

Third mobile station 1103 comprises antenna 1160, sweep circuits 1161 and 1162, frequency change controller 1163, fixed offset addition circuit 1164, diversity combination demodulator 1165, error correction decoder 1166 and voice decoder 1167.

In FIG. 13, 1200 represents a second base station and 1201 to 1203 represent a fourth to sixth mobile stations, respectively. In this example, second base station 1200 is provided with communication circuits for three mobile stations, comprising voice encoders 1210 to 1212, error correction encoders 1213 to 1215, modulators 1216 to 1218, sweep circuits 1219 to 1224, frequency change controllers 1225 to 1227, fixed offset addition circuits 1228 to 1230, adder 1231, amplifier 1232, and antenna 1233.

Fourth mobile station 1201 comprises antenna 1240, sweep circuits 1241 and 1242, frequency change controller 1243, fixed offset addition circuit 1244, diversity combination demodulator 1245, error correction decoder 1246 and voice decoder 1247.

Fifth mobile station 1202 comprises antenna 1250, sweep circuits 1251 and 1252, frequency change controller 1253, fixed offset addition circuit 1254, diversity combination demodulator 1255, error correction decoder 1256 and voice decoder 1257.

Sixth mobile station 1203 comprises antenna 1260, sweep circuits 1261 and 1262, frequency change controller 1263, fixed offset addition circuit 1264, diversity combination demodulator 1265, error correction decoder 1266 and voice decoder 1267.

The operation of the transmission/reception apparatuses configured as shown above are explained. This example illustrates a case where six users perform multi-carrier transmissions using two subcarriers and sector A and sector B each accommodate three users. In this example, a signal is transmitted from first and second base stations 1100 and 1200 to mobile stations 1101 to 1103 and 1201 to 1203, respectively, but transmission of a signal from mobile stations 1101 to 1103 and 1201 to 1203 to base stations 1100 and 1200 is also the same operation.

First, in base station 1100 in sector A shown in FIG. 12, for first mobile station 1101, a digital signal created by voice encoder 1110 is encoded with error correction by error correction encoder 1113, modulated by modulator 1116 and then branched off in two directions.

In one branch, the central frequency of the signal is changed by sweep circuit 1119 according to a first sweep pattern created by frequency change controller 1125. In the other branch, the central frequency of the signal is changed by sweep circuit 1120 according to a second sweep pattern which is the first sweep pattern with an offset added by fixed offset addition circuit 1128.

This allows the same signal to be carried on two subcarriers with central frequencies of different patterns and prevents both subcarriers from overlapping.

Furthermore, for second mobile station 1102, a digital signal created by voice encoder 1111 is encoded with error correction by error correction encoder 1114, modulated by modulator 1117 and then branched off in two directions.

In one branch, the central frequency of the signal is changed by sweep circuit 1121 according to a third sweep pattern which is created by frequency change controller 1126. In the other branch, the central frequency of the signal is changed by sweep circuit 1122 according to a fourth sweep pattern which is the third sweep pattern with an offset added by fixed offset addition circuit 1129.

Furthermore, for third mobile station 1103, a digital signal created by voice encoder 1112 is encoded with error correction by error correction encoder 1115, modulated by modulator 1118 and then branched off in two directions.

In one branch, the central frequency of the signal is changed by sweep circuit 1123 according to a fifth sweep pattern which is created by frequency change controller 1129. In the other branch, the central frequency of the signal is changed by sweep circuit 1124 according to a sixth sweep pattern which is the fifth sweep pattern with an offset added by fixed offset addition circuit 1130.

Here, the amount of offset that fixed offset addition circuits 1128 to 1130 give to the sweep patterns may be equal or different among the mobile stations.

The signals changed with their respective sweep patterns are summed up by adder 1131, amplified by amplifier 1132 and emitted from antenna 1133. Here, the signal emitted from antenna 1133 is a mixture of signals directed to a plurality of mobile stations 1101 to 1103, but they have been changed with mutually different sweep patterns, and thus mobile stations 1101 to 1103 each can receive only the corresponding signal by receiving it with the same sweep pattern as that of the base station.

Likewise, in second base station 1200 in sector B shown in FIG. 13, for fourth mobile station 1201, a digital signal created by voice encoder 1210 is encoded with error correction by error correction encoder 1213, modulated by modulator 1216 and then branched off in two directions.

In one branch, the central frequency of the signal is changed by sweep circuit 1219 according to a seventh sweep pattern created by frequency change controller 1225. In the other branch, the central frequency of the signal is changed by sweep circuit 1220 according to an eighth sweep pattern which is the seventh sweep pattern with an offset added by fixed offset addition circuit 1228.

This allows the same signal to be carried on two subcarriers with central frequencies of different patterns and prevents both subcarriers from overlapping.

Furthermore, for fifth mobile station 1202, a digital signal created by voice encoder 1211 is encoded with error correction by error correction encoder 1214, modulated by modulator 1217 and then branched off in two directions.

In one branch, the central frequency of the signal is changed by sweep circuit 1221 according to a ninth sweep pattern which is created by frequency change controller 1226. In the other branch, the central frequency of the signal is changed by sweep circuit 1222 according to a tenth sweep pattern which is the ninth sweep pattern with an offset added by fixed offset addition circuit 1229.

Furthermore, for sixth mobile station 1203, a digital signal created by voice encoder 1212 is encoded with error correction by error correction encoder 1215, modulated by modulator 1218 and then branched off in two directions.

In one branch, the central frequency of the signal is changed by sweep circuit 1223 according to an eleventh sweep pattern which is created by frequency change controller 1229. In the other branch, the central frequency of the signal is changed by sweep circuit 1224 according to a twelfth sweep pattern which is the eleventh sweep pattern with an offset added by fixed offset addition circuit 1230.

Here, the amount of offset that fixed offset addition circuits 1228 to 1230 give to the sweep patterns may be equal or different among the mobile stations.

The signals changed with their respective sweep patterns are summed up by adder 1231, amplified by amplifier 1232 and emitted from antenna 1233. Here, the signal emitted from antenna 1233 is a mixture of signals directed to a plurality of mobile stations 1201 to 1203, but they have been changed with mutually different sweep patterns, and thus mobile stations 1201 to 1203 each can receive (separate) only the corresponding signal by receiving it with the same sweep pattern as that of the base station.

Moreover, in sector A and sector B, signals can be separated by differentiating either the frequency sweep pattern or fixed offset value or both of them, allowing sector identification and soft handover.

Four examples are shown in ① to ④ below.

① Suppose each pair of frequency change controllers 1125 and 1225, 1126 and 1226, and 1127 and 1227 provides a same sweep pattern with a fixed offset (value specific to the sector) and all frequency offsets added by fixed offset addition circuits 1128 to 1130 and 1228 to 1230 are the same.

② In ① above, suppose frequency offsets added by fixed offset addition circuits 1128 to 1130 are the same, and frequency offsets added by fixed offset addition circuits 1228 to 1230 are all the same, but are different from the frequency offsets added by fixed offset addition circuits 1128 to 1130 (values specific to sectors A and B)

③ In ① above, suppose frequency offsets added by fixed offset addition circuits 1128 to 1130, and frequency offsets added by fixed offset addition circuits 1228 to 1230 are all randomly set, different values (they may match by accident depending on random selection of values).

④ Suppose all sweep patterns created by frequency change controllers 1125 to 1127 and 1225 to 1227 in ③ above are randomly set, different values (they may match by accident depending on random selection of values).

In the receiving side, that is, first mobile station 1101 in sector A, after receiving a signal by antenna 1140, extracts a first desired signal by sweeping it using sweep circuit 1141 according to the same first sweep pattern as that on the transmitting side created by frequency change controller 1143, extracts a second desired signal by sweeping it using sweep circuit 1142 according to the second sweep pattern which is the first sweep pattern with an offset added by fixed offset addition circuit 1144, then, the signals are demodulated by diversity combination demodulator 1145, subjected to error correction by error correction decoder 1146 and their voice is reproduced by voice decoder 1147.

Second mobile station 1102, after receiving a signal by antenna 1150, extracts a first desired signal by sweeping it using sweep circuit 1151 according to the same third sweep pattern as that on the transmitting side created by frequency change controller 1153, extracts a second desired signal by sweeping it using sweep circuit 1152 according to the fourth sweep pattern which is the third sweep pattern with an offset added by fixed offset addition circuit 1154, then, the signals are demodulated by diversity combination demodulator 1155, subjected to error correction by error correction decoder 1156 and their voice is reproduced by voice decoder 1157.

Third mobile station 1103, after receiving a signal by antenna 1160, extracts a first desired signal by sweeping it using sweep circuit 1161 according to the same fifth sweep pattern as that on the transmitting side created by frequency change controller 1163, extracts a second desired signal by sweeping it using sweep circuit 1162 according to the sixth sweep pattern which is the fifth sweep pattern with an offset added by fixed offset addition circuit 1164, then, the signals are demodulated by diversity combination demodulator 1165, subjected to error correction by error correction decoder 1166 and their voice is reproduced by voice decoder 1167.

Likewise, fourth mobile station 1201 in sector B, after receiving a signal by antenna 1240, extracts a first desired signal by sweeping it using sweep circuit 1241 according to the same seventh sweep pattern as that on the transmitting side created by frequency change controller 1243, extracts a second desired signal by sweeping it using sweep circuit 1242 according to the eighth sweep pattern which is the seventh sweep pattern with an offset added by fixed offset addition circuit 1244, then, the signals are demodulated by diversity combination demodulator 1245, subjected to error correction by error correction decoder 1246 and their voice is reproduced by voice decoder 1247.

Fifth mobile station 1202, after receiving a signal by antenna 1250, extracts a first desired signal by sweeping it using sweep circuit 1251 according to the same ninth sweep pattern as that on the transmitting side created by frequency change controller 1253, extracts a second desired signal by sweeping it using sweep circuit 1252 according to the tenth sweep pattern which is the ninth sweep pattern with an offset added by fixed offset addition circuit 1254, then, the signals are demodulated by diversity combination demodulator 1255, subjected to error correction by error correction decoder 1256 and their voice is reproduced by voice decoder 1257.

Sixth mobile station 1203, after receiving a signal by antenna 1260, extracts a first desired signal by sweeping it using sweep circuit 1261 according to the same eleventh sweep pattern as that on the transmitting side created by frequency change controller 1263, extracts a second desired signal by sweeping it using sweep circuit 1262 according to the twelfth sweep pattern which is the eleventh sweep pattern with an offset added by fixed offset addition circuit 1264, then, the signals are demodulated by diversity combination demodulator 1265, subjected to error correction by error correction decoder 1266 and their voice is reproduced by voice decoder 1267.

As shown above, according to Embodiment 11, mobile stations 1101 to 1103 and 1201 to 1203 can each demodulate a plurality of desired signals by giving frequency changes which are different among mobile stations 1101 to 1103 and 1201 to 1203 and their respective subcarriers.

Even if a plurality of signals of a plurality of mobile stations 1101 to 1103 and 1201 to 1203 overlap, each central frequency is shifted causing the amount of interference to be variable with time, and thus the signal quality can be maintained by combining with error correction and interleaving, etc.

Furthermore, the present embodiment prevents a plurality of signals from overlapping, enabling transmission of data with better quality than Embodiment 3. At this time, Embodiment 11 can perform control to prevent subcarriers from overlapping by adding fixed frequency offsets among subcarriers, more easily than Embodiment 4. This makes it possible to achieve multiple access with a same frequency resource used by a plurality of mobile stations 1101 to 1103 and 1201 to 1203.

Furthermore, the frequency sweep patterns of mobile stations 1101 to 1103 in sector A and those in sector B are different patterns, they can be separated on the receiving side and sectors A and B can be distinguished, thus a same frequency band can be used simultaneously. This will make it possible to introduce soft handover or improve the frequency utilization efficiency in addition to Embodiment 5.

As is clear from the above explanations, the present invention provides a lower symbol rate than the CDMA chip rate and further reduces the rate by multi-carrier implementation, making it possible to overcome multi-path fading without using RAKE reception or an equalizer and obtain a stable frequency diversity effect through multi-carrier implementation.

Furthermore, since each user signal only uses a narrow band signal instantaneously, even if only one user erroneously performs transmission power control, only a signal which happens to have a large area of overlapping between the signal and frequency component is affected by this. Moreover, even if noise of a narrow band is mixed, only a signal which happens to have a large area of overlapping between the signal and frequency component is affected.

Furthermore, when introducing an interference canceler to increase the capacity, overlapping of signals is limited to a small number of user signals, allowing the present invention to be implemented with a system scale smaller than the CDMA system.

The bandwidth used can be set irrespective of the symbol rate, allowing the present invention to be easily introduced to any frequency band.

Furthermore, it allows a fraction interval complex adaptive filter to set the synchronization accuracy to a value equivalent to the symbol rate, drastically reducing burden on a synchronization circuit.

These features can eliminate, while retaining advantages of the existing CDMA system, problems of the CDMA system such as waste time for accurate finger detection during RAKE reception, communication disabled state of all mobile stations in a cell due to radio interference among mobile stations, reduction of path diversity effect due to the number of paths variable with time, restrictions on introduction of frequency bands to the system due to restrictions on the bands available to the system, expansion of an interference cancellation apparatus introduced to increase capacities and difficulties in establishing synchronization at a fast chip rate.

This application is based on the Japanese Patent Application No. HEI10-78318 filed on Mar. 10, 1998, entire content of which is expressly incorporated by reference herein.

What is claimed is:

1. A transmission apparatus comprising:
   a modulator that modulates a plurality of signals to be transmitted to a plurality of communication partners; and
   a transmitter that subjects respective transmission signals for the plurality of communication partners to mutually different frequency changes by continuously sweeping, with a plurality of mutually different sweep patterns for the plurality of communication partners, a plurality of signals that have been modulated by said modulator such that respective central frequencies of the plurality of modulated signals change continuously with time, said transmitter further adding and transmitting a plurality of swept signals together, said plurality of swept signals being swept with the plurality of mutually different sweep patterns for the plurality of communication partners.

2. The transmission apparatus according to claim 1, wherein said transmitter further subjects each of the plurality of transmission signals for a same communication partner to mutually different frequency changes by branching-off a same modulated signal to be transmitted to the same communication partner and continuously sweeping the branched-off modulated signals, with a plurality of mutually different sweep patterns, such that respective central frequencies of the branched-off modulated signals change continuously with time, said transmitter further adding and transmitting a plurality of swept branched-off modulated signals together.

3. The transmission apparatus according to claim 2, wherein the plurality of mutually different sweep patterns that continuously sweep respective central frequencies of the branched-off modulated signals are configured such that the respective central frequencies of the branched-off modulated signals do not overlap.

4. The transmission apparatus according to claim 2, wherein said transmitter comprises a transmission power controller that, for every carrier, controls a transmission power to a minimum level required for reception.

5. The transmission apparatus according to claim 2, wherein the plurality of mutually different sweep patterns for the branched-off modulated signals are formed by successively adding an offset to a basic sweep pattern.

6. The transmitter apparatus according to claim 1, wherein said transmitter further comprises a transmission power controller that, for every carrier, controls a transmission power to a minimum level required for reception.

7. The transmission apparatus according to claim 1, wherein the plurality of mutually different sweep patterns are formed by successively adding an offset to a basic sweep pattern.

8. A mobile communication system comprising a plurality of the transmission apparatuses of claim 7, wherein at least one of a sweep pattern and an offset value vary among the plurality of transmission apparatuses.

9. The mobile communication system according to claim 8, wherein the plurality of transmission apparatuses are provided in respective base stations.

10. A mobile communication system comprising a plurality of transmission apparatuses of claim 7, wherein at least one of a sweep pattern and an offset value vary among the plurality of transmission apparatuses and vary for every transmission sequence of each transmission apparatus.

11. The mobile communication system according to claim 10, wherein the plurality of transmission apparatuses are provided in respective base stations.

12. A mobile communication system comprising:
a transmission apparatus comprising:
a modulator that modulates a plurality of signals to be transmitted to a plurality of reception apparatuses; and
a transmitter that subjects respective transmission signals for the plurality of reception apparatuses to mutually different frequency changes by continuously sweeping, with a plurality of mutually different sweep patterns for the plurality of reception apparatuses, a plurality of signals that have been modulated by said modulator such that respective central frequencies of the plurality of modulated signals change continuously with time, said transmitter further adding and transmitting a plurality of swept signals together, the plurality of swept signals being swept with the plurality of mutually different sweep patterns for the plurality of reception apparatuses; and, a reception apparatus comprising:
an antenna that receives a signal transmitted from said transmission apparatus; and
a receiver that detects, from the received signal, a modulated signal to be sent to said reception apparatus, while continuously sweeping a central frequency of the received signal with a sweep pattern the same as one of the plurality of mutually different a sweep patterns used in said transmission apparatus.

13. A reception apparatus communicating with a transmission apparatus that subjects respective transmission signals for a plurality of reception apparatuses to mutually different frequency changes by continuously sweeping a plurality of signals having been modulated with a plurality of mutually different sweep patterns for the plurality of reception apparatuses, such that respective central frequencies of the plurality of modulated signals change continuously with time and that adds and transmits a plurality of swept signals together, the plurality of swept signals being swept with the plurality of mutually different sweep patterns for the plurality of reception apparatuses, said reception apparatus comprising:
an antenna that receives a signal from the transmission apparatus; and
a receiver that detects, from the received signal, the modulated signal to be sent to said reception apparatus, while continuously sweeping a central frequency of the received signal with a sweep pattern the same as one of the plurality of mutually different sweep patterns used in the transmission apparatus.

14. The reception apparatus according to claim 13, wherein said receiver further comprises a fraction interval complex adaptive filter that is configured to improve an S/N ratio of a signal obtained by continuously sweeping the central frequency of the received signal and to perform symbol synchronization.

15. The reception apparatus according to claim 13, wherein, when the transmission apparatus subjects each of the plurality of transmission signals for a same reception apparatus to mutually different frequency changes by branching off a same modulated signal to be transmitted to the same reception apparatus and continuously sweeping branched-off modulated signals, with a plurality of mutually different sweep patterns, such that respective central frequencies of the branched-off modulated signals change continuously with time, and adds and transmits a plurality of swept branched-off modulated signals together, said receiver continuously sweeps a central frequency of the received signal using a same plurality of sweep patterns the same as the plurality of mutually different sweep patterns used in the transmission apparatus for the same modulated signal and thereafter performs diversity combining modulation.

16. The reception apparatus according to claim 13, wherein said receiver further comprises a complex adaptive filter that is configured to improve an S/N ratio of a signal obtained by continuously sweeping the central frequency of the received signal.

17. The reception apparatus according to claim 13, wherein, when in the transmission apparatus, the plurality of mutually different sweep patterns are formed by successively adding an offset to a basic sweep pattern, the plurality of sweep patterns for continuously sweeping the central frequency of the received signal are formed by successively adding an offset to a basic sweep pattern.

18. The reception apparatus according to claim 16, wherein said receiver further comprises a fraction interval complex adaptive filter that is configured to improve an S/N ratio of a signal obtained by continuously sweeping the central frequency of the received signal and to perform symbol synchronization.

19. The reception apparatus according to claim 15, wherein said receiver further comprises:
a plurality of complex adaptive filters configured to improve an S/N ratio of a plurality of signals obtained by continuously sweeping the central frequency of the received signal with a plurality of mutually different sweep patterns; and an adder that adds the plurality of signals processed by said plurality of complex adaptive filters.

20. The reception apparatus according to claim 15, wherein, when in the transmission apparatus, the plurality of mutually different sweep patterns for the branched-off modulated signals are formed by successively adding an offset to a basic sweep pattern, the plurality of sweep patterns for continuously sweeping the central frequency of the received signal are formed by successively adding an offset to a basic sweep pattern.

21. A transmission and reception method, whereby on a transmitting side:

subjecting, respective transmission signals for a plurality of communication partners, to mutually different frequency changes, by continuously sweeping, with a plurality of mutually different sweep patterns for the plurality of communication partners, a plurality of signals that have been modulated and are to be transmitted to the plurality of communication partners, such that respective central frequencies of the plurality of modulated signals change continuously with time, and adding and transmitting a plurality of swept signals together, the plurality of swept signals being swept with the plurality of mutually different sweep patterns for the plurality of communication partners; and whereby on a receiving side:

continuously sweeping a central frequency of the received signal with a same sweep pattern as a sweep pattern used on the transmitting side for sweeping the modulated signal to be sent to the receiving side.

* * * * *

UNITED STATES PATENT AND TRADEMARK OFFICE
CERTIFICATE OF CORRECTION

PATENT NO. : 6,704,345 B1  Page 1 of 1
DATED : March 9, 2004
INVENTOR(S) : M. Uesugi It is certified that error appears in the above-identified patent and that said Letters Patent is hereby corrected as shown below:

Column 26,
Line 11, change "the" to -- a --.

Signed and Sealed this

Fifth Day of October, 2004

JON W. DUDAS
*Director of the United States Patent and Trademark Office*